(12) United States Patent
Bilge

(10) Patent No.: US 8,640,402 B1
(45) Date of Patent: Feb. 4, 2014

(54) BUILDING ROOF FASCIA, COPING AND/OR SOLAR PANEL CONNECTOR ARRANGEMENT

(76) Inventor: Henry H. Bilge, Fort Lee, NJ (US)

( * ) Notice: Subject to any disclaimer, the term of this patent is extended or adjusted under 35 U.S.C. 154(b) by 26 days.

(21) Appl. No.: 13/415,081

(22) Filed: Mar. 8, 2012

(51) Int. Cl.
*E04D 13/18* (2006.01)

(52) U.S. Cl.
USPC ......................................... 52/173.3; 136/251

(58) Field of Classification Search
USPC ............................ 52/173.3; 136/251; 126/704
See application file for complete search history.

(56) References Cited

U.S. PATENT DOCUMENTS

| | | | |
|---|---|---|---|
| 5,076,035 A * | 12/1991 | Wright ............................... | 52/464 |
| 6,105,317 A * | 8/2000 | Tomiuchi et al. ............. | 52/173.3 |
| 7,472,521 B2 | 1/2009 | Bilge | |
| 7,621,084 B2 | 11/2009 | Bilge | |
| 7,915,519 B2 * | 3/2011 | Kobayashi ...................... | 136/251 |
| 7,956,280 B2 * | 6/2011 | Kobayashi ...................... | 136/251 |
| 8,127,507 B1 | 3/2012 | Bilge | |
| 8,273,981 B2 * | 9/2012 | Kobayashi ...................... | 136/251 |
| 8,316,590 B2 * | 11/2012 | Cusson .......................... | 52/173.3 |
| 8,407,895 B2 * | 4/2013 | Hartelius et al. .......... | 29/890.033 |
| 8,413,946 B2 * | 4/2013 | Hartelius et al. ............... | 248/500 |
| 8,418,688 B2 * | 4/2013 | King et al. ...................... | 126/623 |
| 8,461,449 B2 * | 6/2013 | Kobayashi ...................... | 136/251 |
| 2007/0084504 A1 * | 4/2007 | Kobayashi et al. ............ | 136/251 |
| 2010/0237029 A1 * | 9/2010 | Cusson et al. ................ | 211/41.1 |

FOREIGN PATENT DOCUMENTS

JP  2003336357 A  * 11/2003 ................. E04D 3/40

* cited by examiner

*Primary Examiner* — Adriana Figueroa
(74) *Attorney, Agent, or Firm* — Richard M. Goldberg

(57) ABSTRACT

A building roof fascia and coping connector arrangement includes a cleat having a planar wall, a spacer extending inwardly from the planar wall for spacing the planar wall away from a building side when the cleat is secured thereto and having an opening permitting air flow therethrough and between the planar wall and the building, an upper securement assembly at an upper end of the planar wall, and a lower securement assembly at a lower end of the planar wall, with coping secured across an outer surface of the planar wall and connected with the upper and lower securement assemblies; and a vertical load bearing member seating on the building roof when the cleat is secured to the building side, while being connected with an upper end of the cleat to transfer a load from the cleat and the coping to the building roof.

1 Claim, 28 Drawing Sheets

FIG. 5
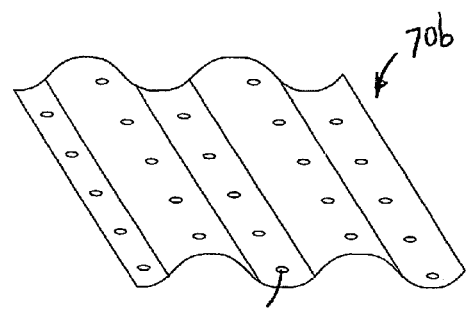
FIG. 6
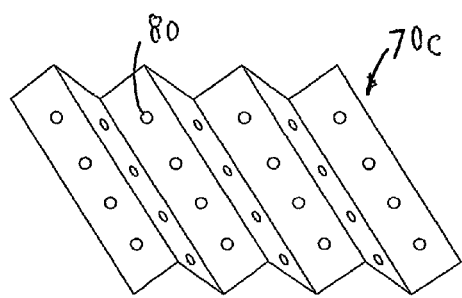
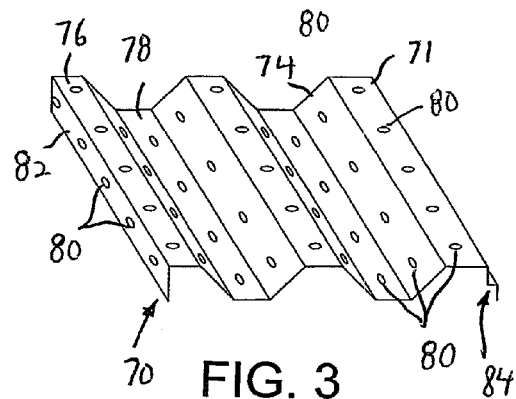
FIG. 3
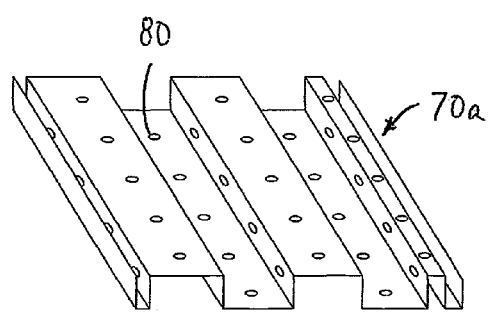
FIG. 4

FIG. 12
FIG. 7
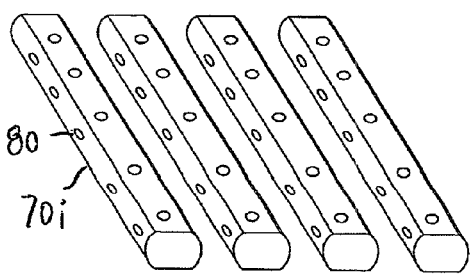
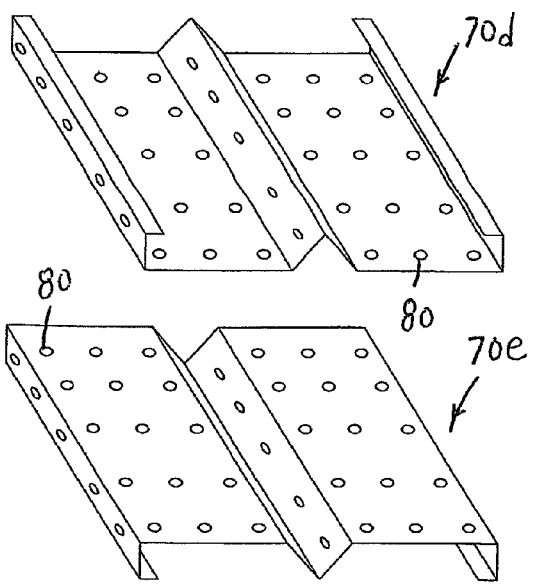
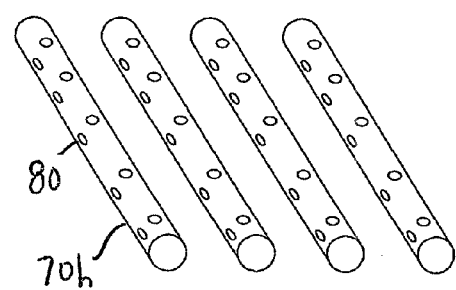
FIG. 11
FIG. 8
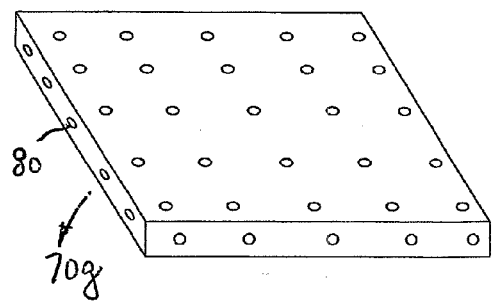
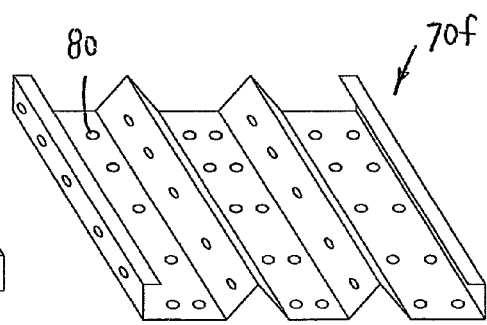
FIG. 10
FIG. 9

FIG. 13
FIG. 14
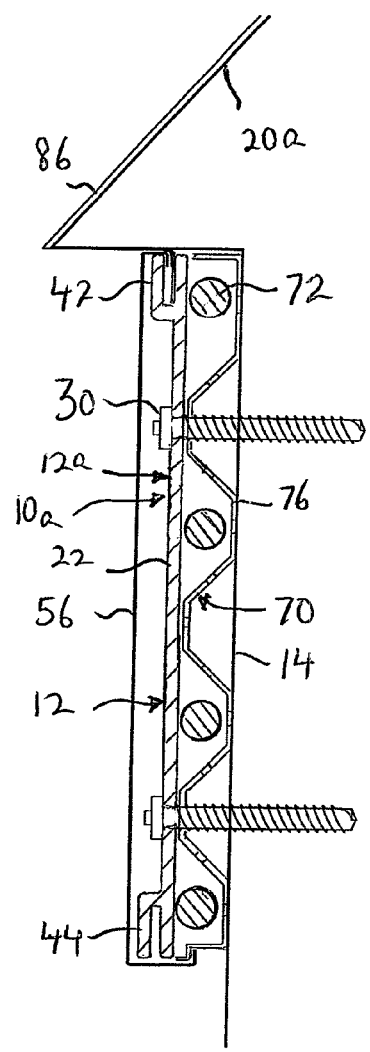
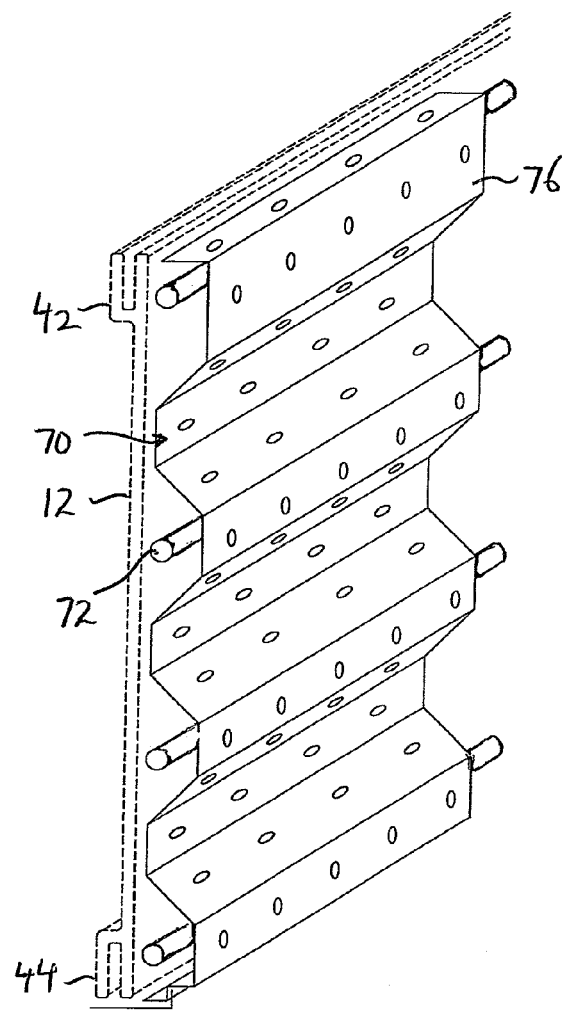

BUILDING ROOF FASCIA, COPING AND/OR SOLAR PANEL CONNECTOR ARRANGEMENT

BACKGROUND OF THE INVENTION

The present invention relates generally to building roofs, and more particularly, to connectors for connecting fascia, coping and other elements such as solar panels to building roofs.

As defined herein, fascia refers to elements that are visible at the side of a building and secured to the side of the building adjacent the roof, and can include coping, solar panels or the like. As defined herein, coping is a finishing or protective cap that is secured to a building. If the coping is visible at the side of the building, it is also included in the definition of fascia, but if the coping is on other non-readily visible areas away from the side of the building, it is not included in the definition of fascia. In like manner, if a solar panel is visible at the side of the building, it is also included in the definition of fascia, but may be on other non-readily visible areas from the side of the building, and in such case, is not included in the definition of fascia.

Typically, there is a membrane which covers building roofs. In order to protect the edges of the membrane and the building roofs, while also providing an aesthetic appearance, a protective fascia in the form of coping is secured to the edges of the building roof, either directly or through cleats secured to the building roof.

However, such known coping and cleats have various disadvantages.

In the first place, the coping and/or cleats are secured directly to the sides of the building adjacent the roof without any air space therebetween, which can, over time, result in reduction in the life of the roof and building. For example, if rain gets into the building, there is no air flow to dry out the building, whereby rot and the like may occur. Also, the outer building wall may get heavily wet due to rain directed thereon by the fascia system.

Secondly, there are no means to provide for easy adjustment up or down of such coping and/or cleats at the side of the building. For example, it may be desirable to adjust the height or shape of the coping, and this cannot easily be accomplished with known systems.

Third, there is no easy way to provide an extension of the coping and cleats in such known systems.

Fourth, because the cleats are secured only to the side of the building by screws or bolts, all of the weight of the cleats and coping is held by the screws or bolts, which places undue pressure thereon which can cause failure.

Fifth, it is often desirable to change the shape or contour of the coping to provide a different aesthetic appearance. Again, this is not easily performed with known systems.

Sixth, because such systems are secured flush against the side of the building, there is no room to add additional elements, such as heating cables or the like. As a result, ice, icicles and snow form at the roof edge and at the coping.

Seventh, such systems fail to provide for attachment of anything other than coping. Thus, for example, if it is desired to secure solar panels to a building, a separate securing system must be provided.

Eighth, due to spacings between fascia extending along the length of the building, water can leak down the side of the building between adjacent fascia and leave unsightly water marks on the building. This also functions to reduce the life of the building.

SUMMARY OF THE INVENTION

Accordingly, it is an object of the present invention to provide a building roof fascia, coping and solar panel connector arrangement that overcomes the aforementioned problems.

It is another object of the present invention to provide a building roof fascia, coping and solar panel connector arrangement that is spaced from the side of the building to provide an air gap therebetween, and thereby provide air flow between the connector and the building.

It is still another object of the present invention to provide a building roof fascia, coping and solar panel connector arrangement which can easily be adjusted in position along the side of the building.

It is yet another object of the present invention to provide a building roof fascia, coping and solar panel connector arrangement that can easily be extended to different vertical lengths up and down along the side of the building.

It is a further object of the present invention to provide a building roof fascia, coping and solar panel connector arrangement in which the load thereof is transferred or distributed to the roof of the building.

It is a still further object of the present invention to provide a building roof fascia, coping and solar panel connector arrangement that can easily change the shape or contour of coping secured thereto.

It is a yet further object of the present invention to provide a building roof fascia, coping and solar panel connector arrangement that can hold heating cables to prevent the formation of ice, icicles and snow thereat.

It is another object of the present invention to provide a building roof fascia, coping and solar panel connector arrangement that can secure other items, such as solar panels, in addition to coping.

It is still another object of the present invention to provide a building roof fascia, coping and solar panel connector arrangement that is easy and economical to use and manufacture.

In accordance with an aspect of the present invention, a building roof fascia and coping connector arrangement comprises a first cleat which includes a first elongated wall, a first spacer element extending inwardly from the first elongated wall and which spaces the first elongated wall away from a side of a building when the cleat is secured to the side of the building; a first upper securement assembly at an upper end of the first elongated wall; and a first lower securement assembly at a lower end of the first elongated wall, wherein a coping is adapted to be secured across an outer surface of the cleat and secured to at least one of the first upper and lower securement assemblies.

Each of the upper and lower securement assemblies includes an L-shaped wall extending outwardly from the elongated wall.

The spacer element includes a planar wall extending inwardly from the elongated wall and/or an L-shaped wall extending inwardly from the elongated wall, each formed integrally with the elongated wall. The spacer element can also include a separate wall adapted to be positioned adjacent an inner surface of the elongated wall. The separate wall may include one of the following walls, namely, an angled zig-zag wall in cross-section having angled walls separated by flat walls; a square zig-zag wall in cross-section; an angled zig-zag wall in triangular cross-section; a sinusoidal wall; an angled zig-zag wall in triangular cross-section separated by flat walls; a parallelepiped wall; and separate rods. Each spacer element includes at least one through opening to permit air flow therethrough and between the elongated wall and the building.

The building roof fascia and coping connector arrangement further includes a vertical load bearing member which is adapted to seat on a roof of the building when the cleat is secured to the side of the building, while being connected in a supporting manner with an upper end of the cleat to transfer a load from the cleat and the coping to the roof of the building. The vertical load bearing member includes a first wall that is adapted to seat on the roof of the building and a second wall connected with the first wall and extending at an angle thereto for engagement with the upper end of the cleat.

The cleat includes a load bearing member securement at the upper end thereof for receiving the second wall of the vertical load bearing member. The load bearing member securement includes one of the following extending from the upper end of the elongated wall, to receive the second wall of the vertical load bearing member, namely, an inwardly directed L-shaped wall which opens downwardly; an inwardly directed J-shaped wall; or an inwardly directed curved wall.

In another embodiment, the vertical load bearing member includes a load bearing member securement at an upper of the second wall of the vertical load bearing member for receiving an upper end of the cleat therein. In such case, each of said load bearing member securement and the upper end of the cleat received therein include, respectively, one of the following similar shaped walls, namely, an outwardly directed triangular wall downwardly; an outwardly directed J-shaped wall; or an outwardly directed curved wall.

The building roof fascia and coping connector arrangement also includes at least one coping guide adapted to be secured to an outer surface of the elongated wall for guiding a shape of the coping.

In another embodiment, a second cleat is secured to the side of the building at a position below the first cleat, the second cleat including a second elongated wall; a second spacer element extending inwardly from the second elongated wall and which spaces the second elongated wall away from the side of the building when the second cleat is secured to the side of the building; a second upper securement assembly at an upper end of the second elongated wall; and a second lower securement assembly at a lower end of the second elongated wall for securing an end of the coping thereto, with an opposite end of the coping secured to the first upper securement assembly of the first cleat.

In one embodiment, the first lower securement assembly is engaged with the second upper securement assembly. In another embodiment, the first and second cleats are vertically separated, and there is a spacer element which connects together the first and second cleats, wherein the spacer element includes a bent wall having one end connected with the first lower securement assembly and an opposite end connected with the second upper securement assembly.

Preferably, there is at least one heating cable positioned between the first cleat and the building.

In another embodiment, building roof fascia and coping connector arrangement includes an upper solar panel connector for connecting an upper end of a solar panel to the upper securement assembly, and a lower solar panel connector for connecting a lower end of the solar panel to either the lower securement assembly of the first cleat, or a lower securement assembly of a second cleat positioned below the first cleat. There may also be at least one further cleat secured to the first cleat for securing a solar panel above a roof of the building.

In still another embodiment, an upper solar panel connector is provided for connecting an upper end of a solar panel to first upper securement assembly, and a lower solar panel connector is provided for connecting a lower end of the solar panel to first lower securement assembly.

In another embodiment, a building connector arrangement for securing at least one solar panel to a building, includes a cleat including an elongated wall adapted to be secured to the building and at least one L-shaped wall extending outwardly from the elongated wall; and a U-shaped solar panel connector having one end engaged with the L-shaped wall and with a front surface of the solar panel, and an opposite end engaged with a rear surface of the solar panel.

The above and other features of the invention will become readily apparent from the following detailed description thereof which is to be read in connection with the accompanying drawings.

BRIEF DESCRIPTION OF THE DRAWINGS

FIG. 3 is a perspective view of the additional spacer element of FIG. 2;

FIG. 4 is a perspective view of a first alternative additional spacer element that can be used with the building roof fascia and coping connector arrangement of FIG. 2;

FIG. 5 is a perspective view of a second alternative additional spacer element that can be used with the building roof fascia and coping connector arrangement of FIG. 2;

FIG. 6 is a perspective view of a third alternative additional spacer element that can be used with the building roof fascia and coping connector arrangement of FIG. 2;

FIG. 7 is a perspective view of a fourth alternative additional spacer element that can be used with the building roof fascia and coping connector arrangement of FIG. 2;

FIG. 8 is a perspective view of a fifth alternative additional spacer element that can be used with the building roof fascia and coping connector arrangement of FIG. 2;

FIG. 9 is a perspective view of a sixth alternative additional spacer element that can be used with the building roof fascia and coping connector arrangement of FIG. 2;

FIG. 10 is a perspective view of a seventh alternative additional spacer element that can be used with the building roof fascia and coping connector arrangement of FIG. 2;

FIG. 11 is a perspective view of eighth alternative additional spacer elements that can be used with the building roof fascia and coping connector arrangement of FIG. 2;

FIG. 12 is a perspective view of ninth alternative additional spacer elements that can be used with the building roof fascia and coping connector arrangement of FIG. 2;

FIG. 13 is a cross-sectional view showing a building roof fascia and coping connector arrangement which is slightly modified from that of FIG. 2, for use with a slanted roof;

FIG. 14 is a perspective view of the building roof fascia and coping connector arrangement of FIG. 13;

DETAILED DESCRIPTION

Figure 1:
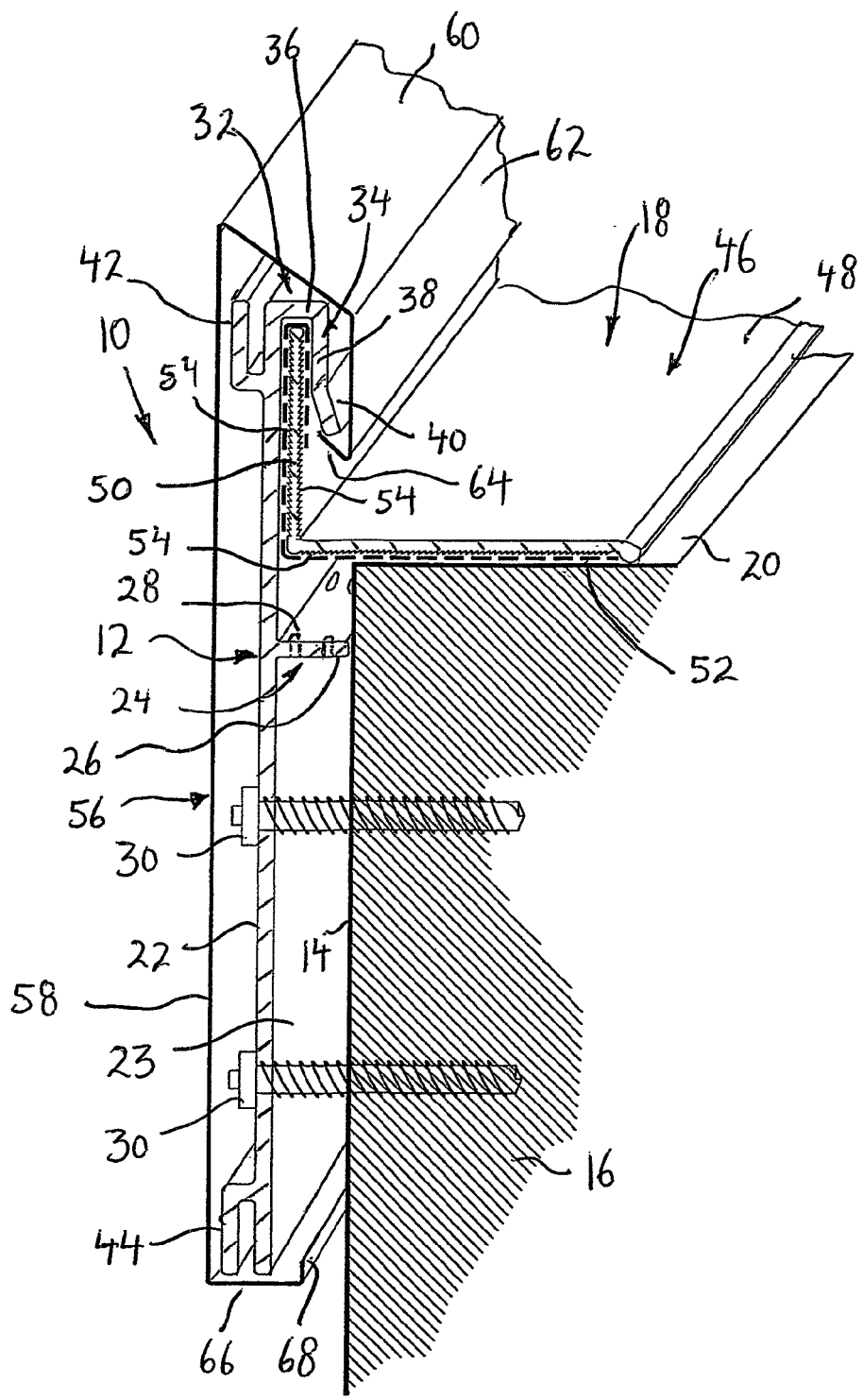
FIG. 1 is a perspective view, partly in section, of a building roof fascia and coping connector arrangement according to a first embodiment of the present invention.

Referring to the drawings in detail, and initially to FIG. 1 thereof, there is shown a building roof fascia and coping connector arrangement 10 according to the present invention. Building roof fascia and coping connector arrangement 10 includes a cleat 12, preferably formed of aluminum, secured to a side 14 of a building 16, and a vertical load bearing member 18 mounted on the roof 20 of the building 16 and connected with cleat 12.

Cleat 12 includes an elongated planar wall 22 extending in spaced, parallel relation to building side 14 by a spacer element 24. In FIG. 1, spacer element 24 is a spacer wall 26 formed integrally as one piece with planar wall 22 and extending inwardly at a right angle from planar wall 22, and extending along building side 14. As a result of this arrangement, air flow is provided in the space 23 between building side 14 and planar wall 22, as well as providing air pressure equalization between space 23 and ambient air. In order that spacer wall 26 not impede such air flow, a plurality of holes 28 are provided in spacer wall. Although there is only one spacer wall 26 shown, a plurality of vertically displaced spacer walls 26 can be provided. Further, although spacer wall 26 is shown being at a position below roof 20, it may be positioned at the edge of roof 20, that is, substantially coplanar with roof 20. Screws 30 extend through planar wall 22 to secure cleat 12 to building side 14. Preferably, there are two rows of vertically displaced screws 30 extending along planar wall 22, although the present invention is not limited thereby.

Cleat 12 further includes a load bearing member securement 32 in the form of an L-shaped wall 34 formed integrally as one piece with and extending inwardly along the upper end of planar wall 22. L-shaped wall 34 includes a first wall 36 extending inwardly from the upper edge of planar wall 22, and a second wall 38 that extends downwardly from the inner edge of first wall 36 in substantially parallel, spaced relation to planar wall 22, with the lower end 40 of second wall 38 preferably being bent inwardly away from planar wall 22 to better receive the coping, as shown in FIG. 1.

Cleat 12 also includes a first upper, outwardly extending L-shaped wall 42 formed integrally as one piece with and extending along the upper end of planar wall 22 and a second lower, outwardly extending L-shaped wall 44 formed integrally as one piece with and extending along the lower end of planar wall 22. First outwardly extending L-shaped wall 42 opens upwardly while second outwardly extending L-shaped wall 44 opens downwardly, although the present invention is not limited thereby.

Vertical load bearing member 18 is formed as an L-shaped wall 46 extending along roof 20, and preferably made of aluminum. L-shaped wall 46 has a first wall 48 that seats flush on roof 20 at the edge thereof, and a second wall 50 that extends vertically up from the outer edge of first wall 48 and seats within inwardly directed L-shaped wall 34. As a result of this arrangement, the weight of cleat 12 and the coping attached thereto, is borne mostly by vertical load bearing member 18 seated on top of roof 20, thereby taking the majority of the load and any pressure off of screws 30 and transferring the same to roof 20.

Further, with this arrangement, the roof membrane 52 that typically extends across roof, extends below first wall 48 of L-shaped wall 46, across the outer surface of second wall 50, over the top of second wall 50 and down partially across the inner surface of second wall 50, whereby roof membrane 52 is secured in place. Roof membrane 52 can be formed with an adhesive or tacky surface on one or both sides, or alternatively, a separate membrane (not shown) with a two sided adhesive surface can be used to secure roof membrane 52 to roof 20. With this connection of roof membrane 52, edges of roof membrane 52 become water tight and do not require any other material or work to waterproof the same.

To further aid in this securement, and to prevent accidental dislodgement of roof membrane 52, the lower surface of first wall 48 of vertical load bearing member 18 is preferably formed with serrations or sharp teeth 54 and the inner and outer surfaces of second wall 50 of vertical load bearing member 18 are also formed with serrations or sharp teeth 54.

A thin aluminum sheet of coping 56 is secured around cleat 12. Coping 56 includes a vertical first section 58 having dimensions similar to that of planar wall 22 and extending outwardly therefrom in a parallel, spaced relation by reason of outwardly extending L-shaped walls 42 and 44. Coping 56 is bent at its upper edge to form an inwardly directed second section 60 that extends above cleat 12, is then bent at the inner edge of second section 60 to form a downwardly extending third section 62 that extends in parallel relation to second wall 38 of load bearing member securement 32, and is then bent at the lower edge of third section 62 to form an upward angularly oriented fourth section 64 that is held by lower bent end 40 of second wall 38. Coping 56 is bent at its lower edge to form an inwardly directed fifth section 66 that extends below cleat 12, and is then bent at the inner edge of fifth section 66 to form an upwardly extending sixth section 62 that extends in space 23 behind planar wall 22. As a result, coping 56 is held in place to provide an aesthetic appearance.

With this arrangement, unlike known arrangements, coping 56 and cleat 12 are secured directly to the side 14 of building 16 adjacent roof 20, with an air space 23 therebetween, which increases the life of the roof and building. In addition, the height of cleat 12 can be easily changed by securing it at a different vertically position.

Further, although cleat 12 is secured to the side of the building by screws 30, the majority of the weight of cleat 12 and coping 56 is borne by vertical load bearing member 18 which seats directly on top of roof 20, thereby relieving the pressure on screws 30.

Figure 2:
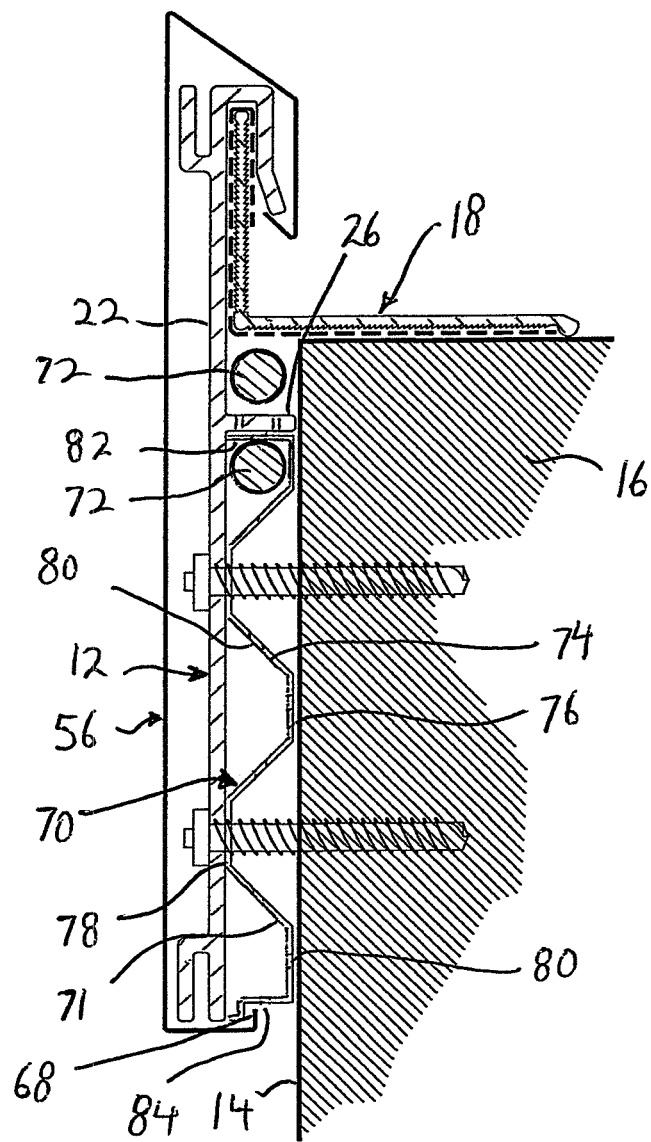
FIG. 2 is a cross-sectional view of the building roof fascia and coping connector arrangement of FIG. 1, with an additional spacer element and heating cables.

Referring now to FIG. 2, there is shown a cross-sectional view of building roof fascia and coping connector arrangement 10 of FIG. 1, with an additional spacer element 70 and heating cables 72.

Additional spacer element 70 is shown in perspective in FIG. 3 and includes a thin sheet 71 of aluminum in a zig-zag shape in cross-section with angled walls 74 separated by flat inner vertical walls 76 and flat outer vertical walls 78 that seat flush against the side 14 of building 16 and the inner surface of planar wall 22, respectively. All of walls 74, 76 and 78 include holes 80 extending therealong to permit air flow through space 23. The upper end of thin sheet 71 is bent to form an outwardly extending horizontal section 82 that seats immediately below spacer wall 26 in parallel relation thereto. The lower end of thin sheet 71 is bent in an outwardly directed stepped section 84 that is captured between planar wall 22 and upwardly extending sixth section 68 of coping 56. Outwardly extending horizontal section 82 and outwardly directed stepped section 84 also both include holes 80. Screws 30 preferably extend through holes 80 in outer vertical walls 78. In addition, as shown in FIG. 2, to provide more ventilation, inner vertical walls 76 may be spaced slightly away from building side 14.

In order to prevent the formation of snow, ice and icicles at the edge of roof 20, on cleat 12 and on coping 56, heating cables 72 can be positioned in space 23. As shown in FIG. 2, one heating cable 72 is positioned directly about spacer wall 26, and another heating cable 72 is positioned directly below spacer wall 26. Heating cables 72 can also be positioned at other areas, for example, between each inner vertical wall 76 and planar wall 22. Heating cables 72 include a plug (not shown) at one end that can be plugged into a wall socket to power the same.

It will be appreciated that additional spacer element 70 can take many different shapes, such as the square zig-zag shaped additional spacer element 70a in cross-section of FIG. 4 with the connection between all walls being perpendicular, the sinusoidal shaped additional spacer element 70b or FIG. 5, the triangular in cross-section shaped additional spacer element 70c of FIG. 6, the planar shaped additional spacer element 70d or FIG. 7 with one inwardly directed triangular bend, the planar shaped additional spacer element 70e or FIG. 8 with one outwardly directed triangular bend, and the planar shaped additional spacer element 70f or FIG. 9 with two inwardly directed triangular bends. Additional spacer elements 70d, 70e and 70f are all therefore similar in that they all include an angled zig-zag wall in triangular cross-section separated by flat walls. Additional spacer element 70 can also be of a parallelepiped shaped additional spacer element 70g as shown in FIG. 10. Alternatively, rather than one additional spacer element 70, a plurality of cylindrical rod-like additional spacer elements 70h as shown in FIG. 11 or rectangular cross-sectioned rod-like additional spacer elements 70i as shown in FIG. 12, can be used. With all of the above additional spacer elements 70a-70i, holes 80 are provided therethrough to permit air flow into space 23.

Further, all of the above additional spacer elements can be cut down to the desired size as needed, with only that cut section being used.

It will be appreciated that additional spacer element 70 can be used as the only spacer element, with spacer wall 26 being eliminated from cleat 12a, as shown in FIGS. 13 and 14. In this embodiment, building roof fascia and coping connector arrangement 10a is modified to eliminate spacer wall 26 and load bearing member securement 32 because it is utilized below the eave of a slanted roof 20a. In this case, the flashing 86 from roof 20a is bent down under the eave and into the upper open end of first outwardly extending L-shaped wall 42 along with the upper end of coping 56. Further, a plurality of cables 72 are positioned between each inner vertical wall 76 and planar wall 22.

Figure 15:
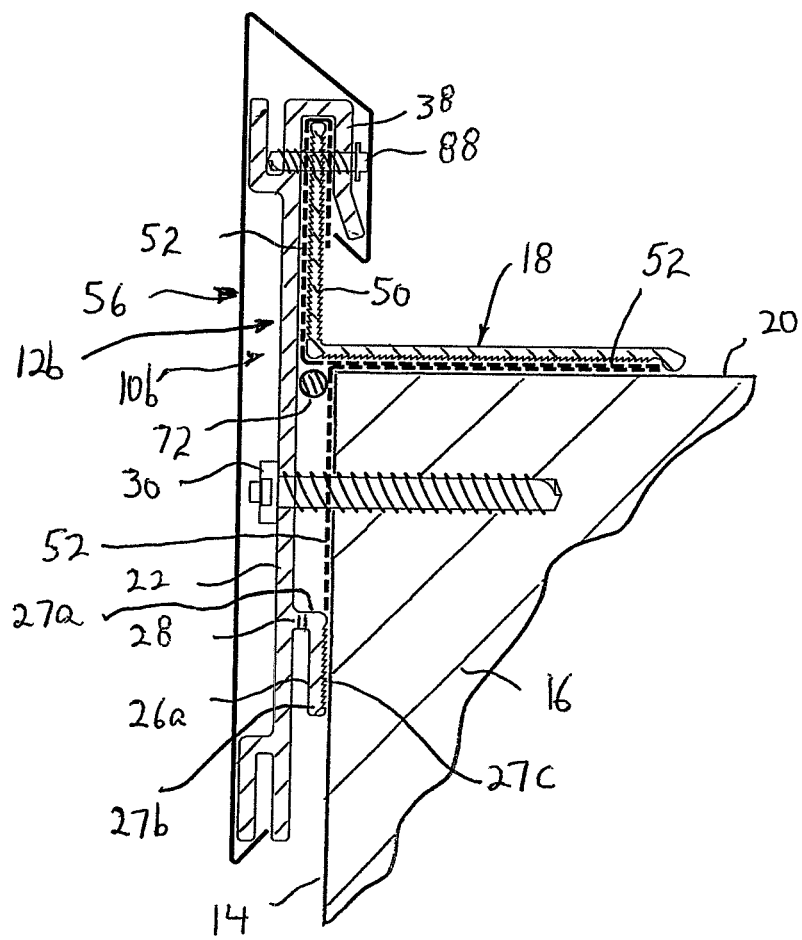
FIG. 15 is a cross-sectional view showing a building roof fascia and coping connector arrangement having a cleat which is similar to that of FIG. 1, but in which the inner spacer element has an L-shape.

Referring now to FIG. 15, there is shown a building roof fascia and coping connector arrangement 10b which includes a cleat 12b similar to cleat 12 of FIG. 1, but in which the inner spacer element 24 is formed as an L-shaped spacer element 26a with a first elongated wall 27a extending inwardly from planar wall 22 and a second elongated wall 27b extending down from the free edge of wall 27a in parallel relation to building side 14. The inner surface of downwardly extending wall 27b preferably has serrations or teeth 27c which can grip building side 14 or can grip roof membrane 52 which is bent down from roof 20. It will be appreciated that a separate roofing membrane 52 can also be bent upwardly in the same manner as in FIG. 1. However, as shown in FIG. 15, a bolt 88 extends through second wall 38, roofing membrane 52, second wall 50, roofing membrane 52 on the opposite side of second wall 50 and planar wall 22 to securely hold all elements together and to prevent escape of second wall 50 of vertical load bearing member 18 and to prevent slippage of roofing membrane 52.

Figure 16:
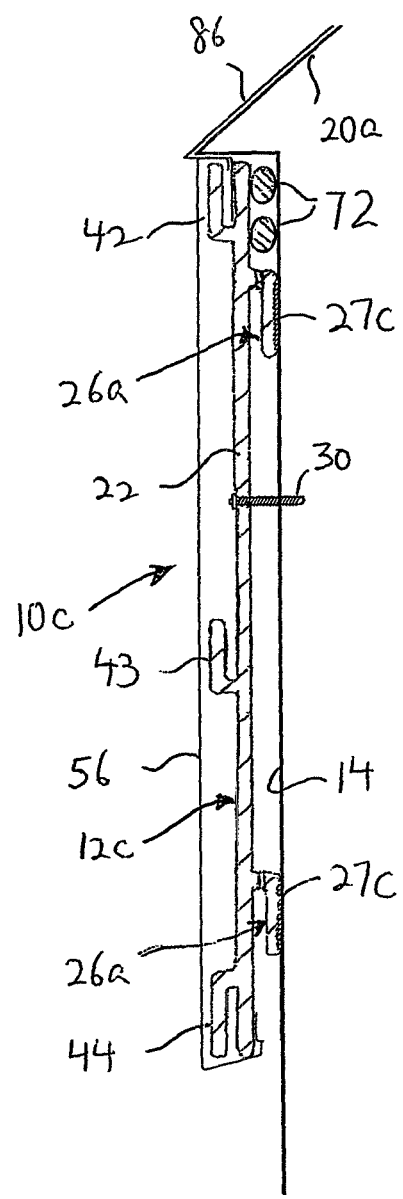
FIG. 16 is a cross-sectional view showing a building roof fascia and coping connector arrangement having a cleat which is similar to that of FIG. 13, but in which there are two L-shaped inner spacer elements.
Figure 17:
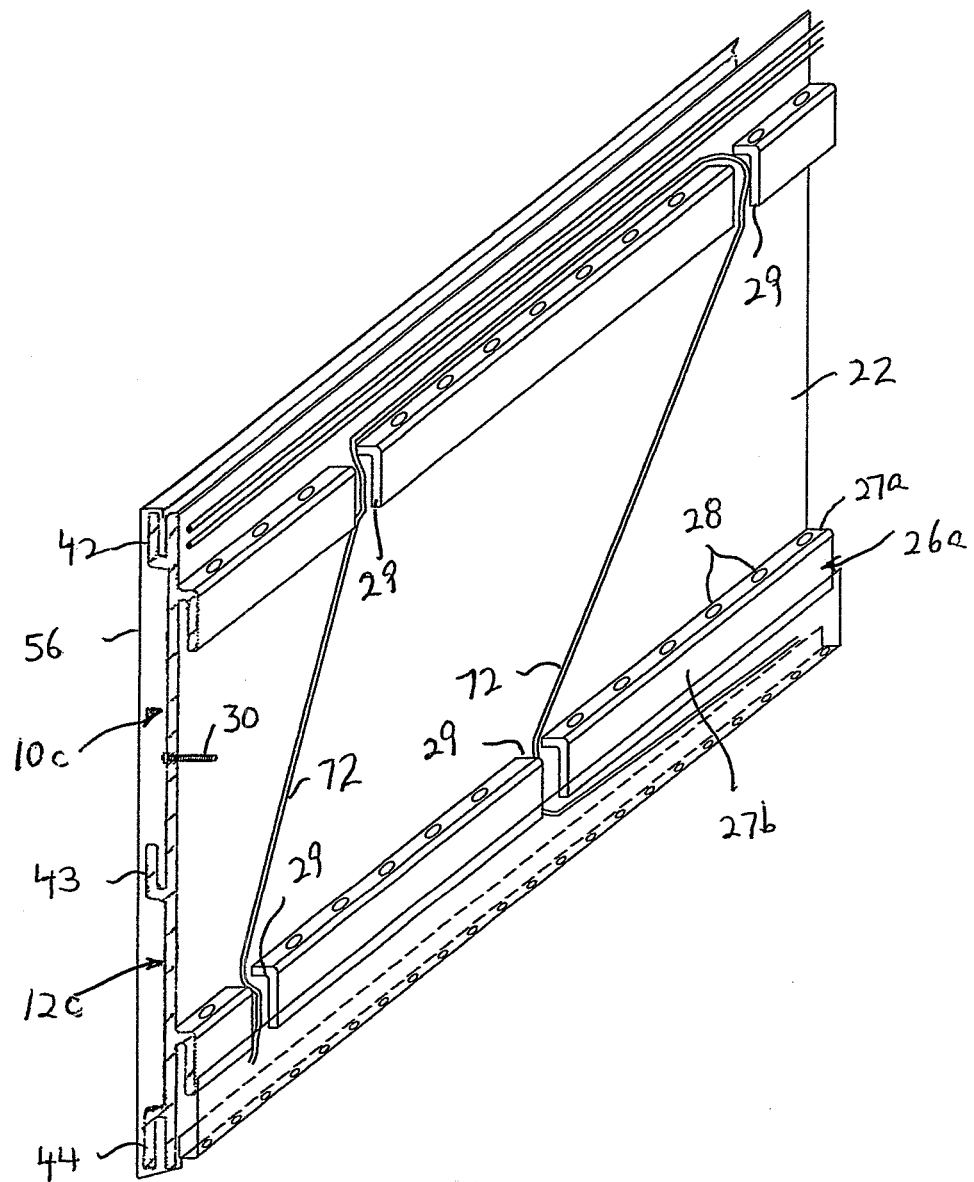
FIG. 17 is a perspective view of the building roof fascia and coping connector arrangement of FIG. 16.

Referring now to FIGS. 16 and 17, there is shown a building roof fascia and coping connector arrangement 10c which includes a cleat 12c which is similar to cleat 12a of FIG. 13, but in which there are two L-shaped inner spacer elements 26a vertically spaced apart from each other, each having serrations or teeth 27c and two heating cables 72 positioned above the upper L-shaped inner spacer element 26a. In addition, because planar wall 22 has a vertical length which is greater than the planar wall 22 shown in FIG. 13, a third outwardly extending L-shaped wall 43 extends outwardly from planar wall 22 at a position between first and second outwardly extending L-shaped walls 42 and 44 in order to better space coping 56 from planar wall 22. As shown best in FIG. 17, L-shaped inner spacer elements 26a are preferably broken at positions 29 along the lengths thereof in order to more easily control positioning of heating cables 72.

Figure 18:
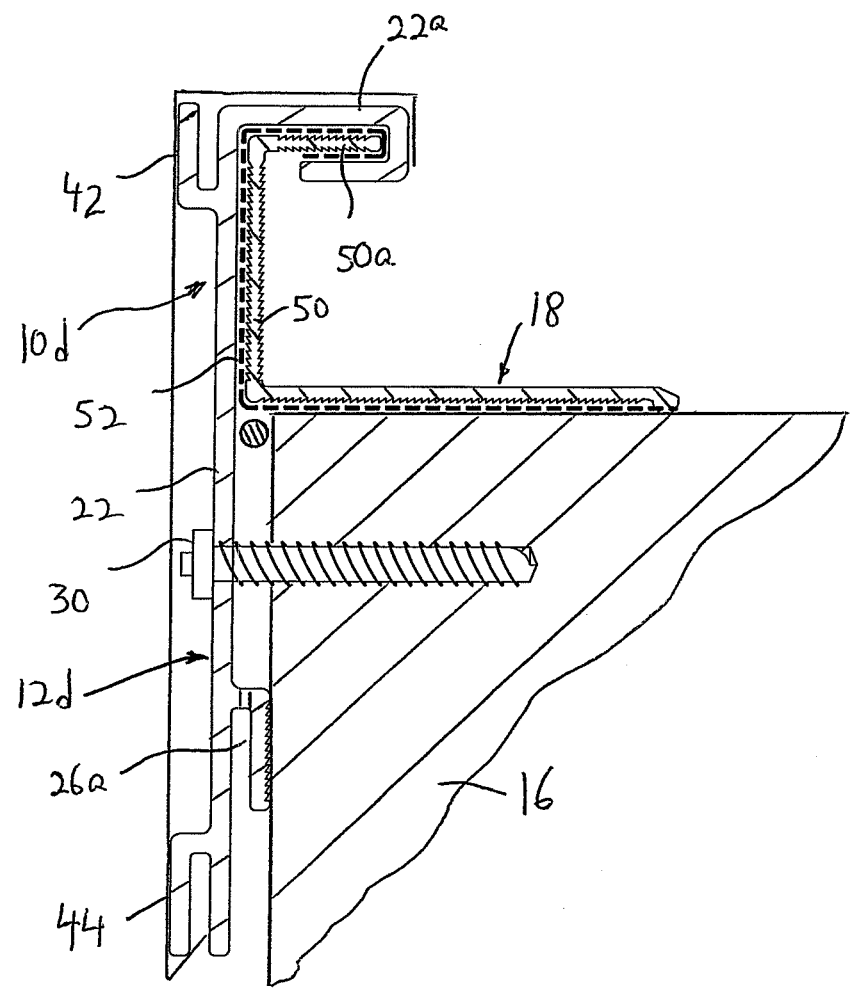
FIG. 18 is a cross-sectional view showing a building roof fascia and coping connector arrangement having a cleat which is similar to that of FIG. 15, but in which the upper end is bent inwardly at a right angle.

Referring now to FIG. 18, there is shown a building roof fascia and coping connector arrangement 10d which includes a cleat 12d which is similar to cleat 12b of FIG. 15, but in which the upper end of planar wall 22 is bent inwardly at a right angle in a J-shaped bend 22a, and the upper end of second wall 50 of vertical load bearing member 18 also includes an inward right angle bend 50a that fits within J-shaped bend 22a. Roofing membrane 52 extends around inward right angle bend 50a and within J-shaped bend 22a. Coping 56 extends around J-shaped bend 22a at its upper end.

Figure 19:
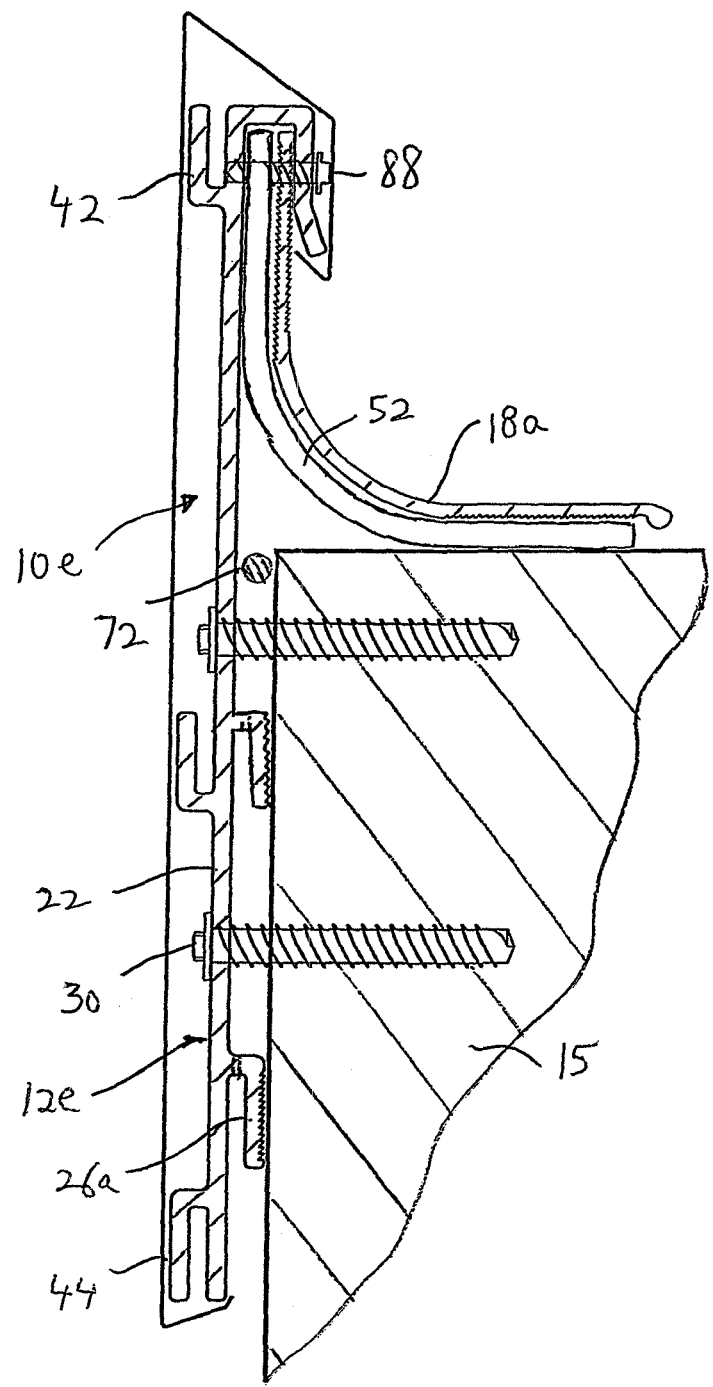
FIG. 19 is a cross-sectional view showing a building roof fascia and coping connector arrangement having a cleat which is similar to that of FIG. 16, but with the upper end shaped like that of FIG. 1, and in which the vertical load bearing member is arcuate rather than L-shaped.

Referring now to FIG. 19, there is shown a building roof fascia and coping connector arrangement 10e which includes a cleat 12e which is similar to cleat 12c of FIG. 16, but with the upper end shaped like that of FIG. 1, and in which the vertical load bearing member 18a is arcuate rather than being L-shaped.

Figure 20:
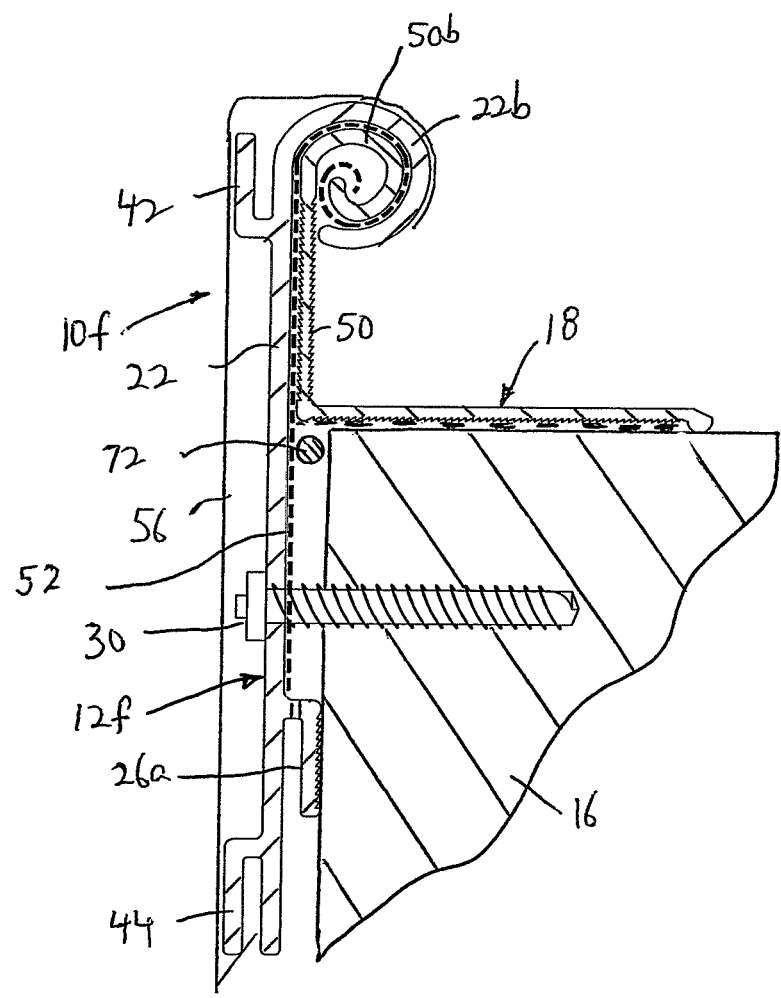
FIG. 20 is a cross-sectional view showing a building roof fascia and coping connector arrangement having a cleat which is similar to that of FIG. 15, but in which the upper end is bent inwardly in a circular shape.

Referring now to FIG. 20, there is shown a building roof fascia and coping connector arrangement 10f which includes a cleat 12f which is similar to cleat 12b of FIG. 15, but in which the upper end of planar wall 22 has a substantially circular cross-sectional shaped inward bend 22b with the free end spaced slightly away from planar wall 22, and the upper end of second wall 50 of vertical load bearing member 18 also includes a substantially circular cross-sectional shaped inward bend 50b that fits within substantially circular cross-sectional shaped inward bend 22b. Roofing membrane 52 extends around substantially circular cross-sectional shaped inward bend 50b and within substantially circular cross-sectional shaped inward bend 22b. Coping 56 extends around substantially circular cross-sectional shaped inward bend 22b at its upper end.

Figure 21:
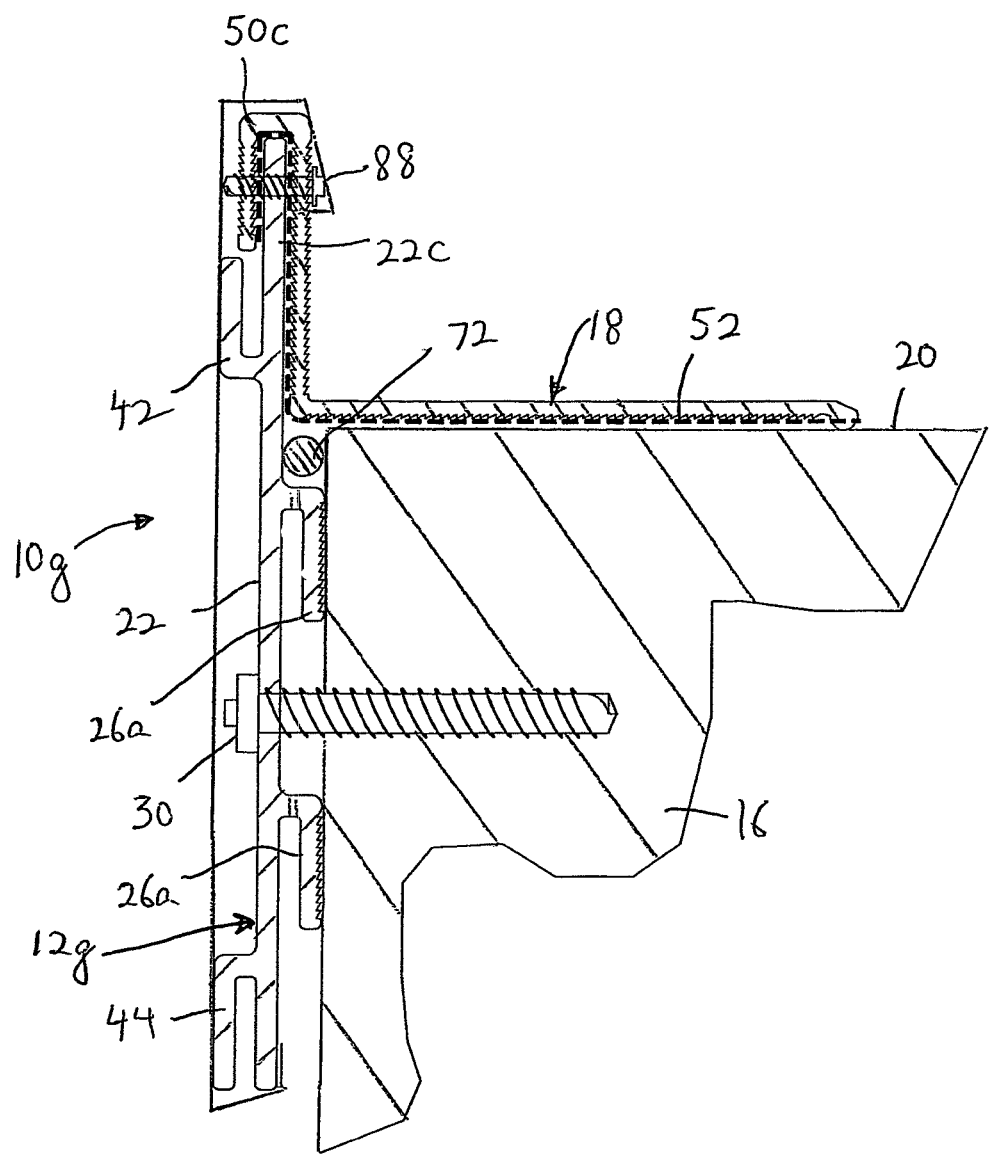
FIG. 21 is a cross-sectional view showing a building roof fascia and coping connector arrangement having a cleat which is similar to that of FIG. 16, but in which the upper end is extended vertically above the L-shape outward projection thereat and the upper end of the vertical load bearing member has an outward L-shaped bend around the upper vertical extension of the cleat.

Referring now to FIG. 21, there is shown a building roof fascia and coping connector arrangement 10g which includes a cleat 12g which is similar to cleat 12c of FIG. 16, but in which the upper end of planar wall 22 has an upward extension 22c which extends vertically above first outwardly extending L-shaped wall 42, and the upper end of second wall 50 of vertical load bearing member 18 also includes an outward L-shaped bend 50c that receives upward extension 22c therein. Roofing membrane 52 extends around upward extension 22c and within L-shaped bend 50c. Coping 56 extends around L-shaped bend 50c at its upper end. Bolt 88 extends through second wall 50, roofing membrane 52, upward extension 22c, roofing membrane 52 on the opposite side of upward extension 22c and L-shaped bend 50c to securely hold all elements together and to prevent escape of upward extension 22c from L-shaped bend 50c and to prevent slippage of roofing membrane 52.

Figure 21A:
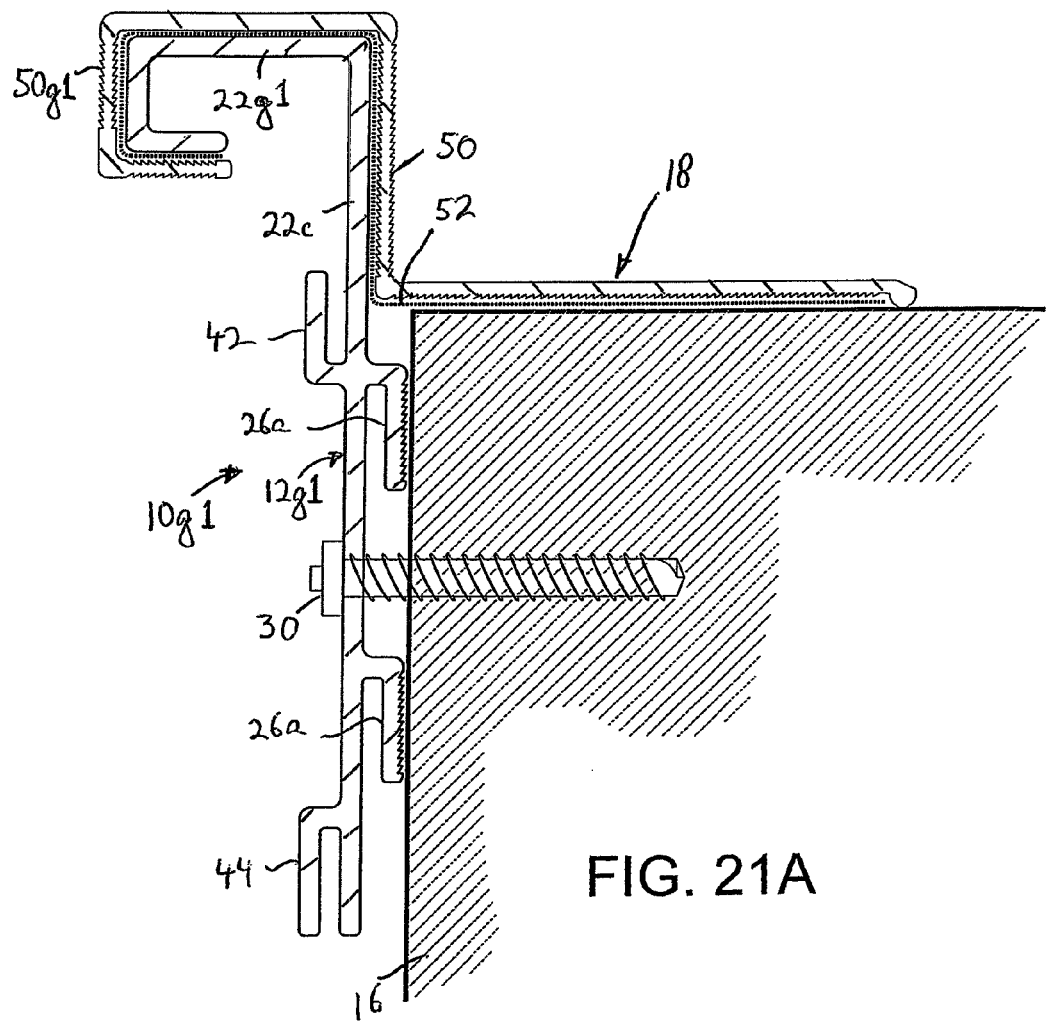
FIG. 21A is a cross-sectional view showing a building roof fascia and coping connector arrangement having a cleat which is similar to that of FIG. 21, but in which the upper end is extended vertically above the L-shape outward projection thereat and then has an outward J-shaped bend therefrom, and the upper end of the vertical load bearing member has an outward J-shaped bend around the outward J-shaped bend of the cleat.

FIG. 21A shows a building roof fascia and coping connector arrangement 10g1 having a cleat 12g1 which is similar to cleat 12g of FIG. 21, but in which upward extension 22c is bent outwardly at a right angle in a J-shaped bend 22g1, and the upper end of second wall 50 of vertical load bearing member 18 is bent outwardly at a right angle in a J-shaped bend 50g1 and fits around J-shaped bend 22g1. Roofing membrane 52 extends around outward J-shaped bend 50g1 and within J-shaped bend 22g1. Coping (not shown) extends from second outwardly extending L-shaped wall 44 up around first outwardly extending L-shaped wall 42.

Figure 21B:
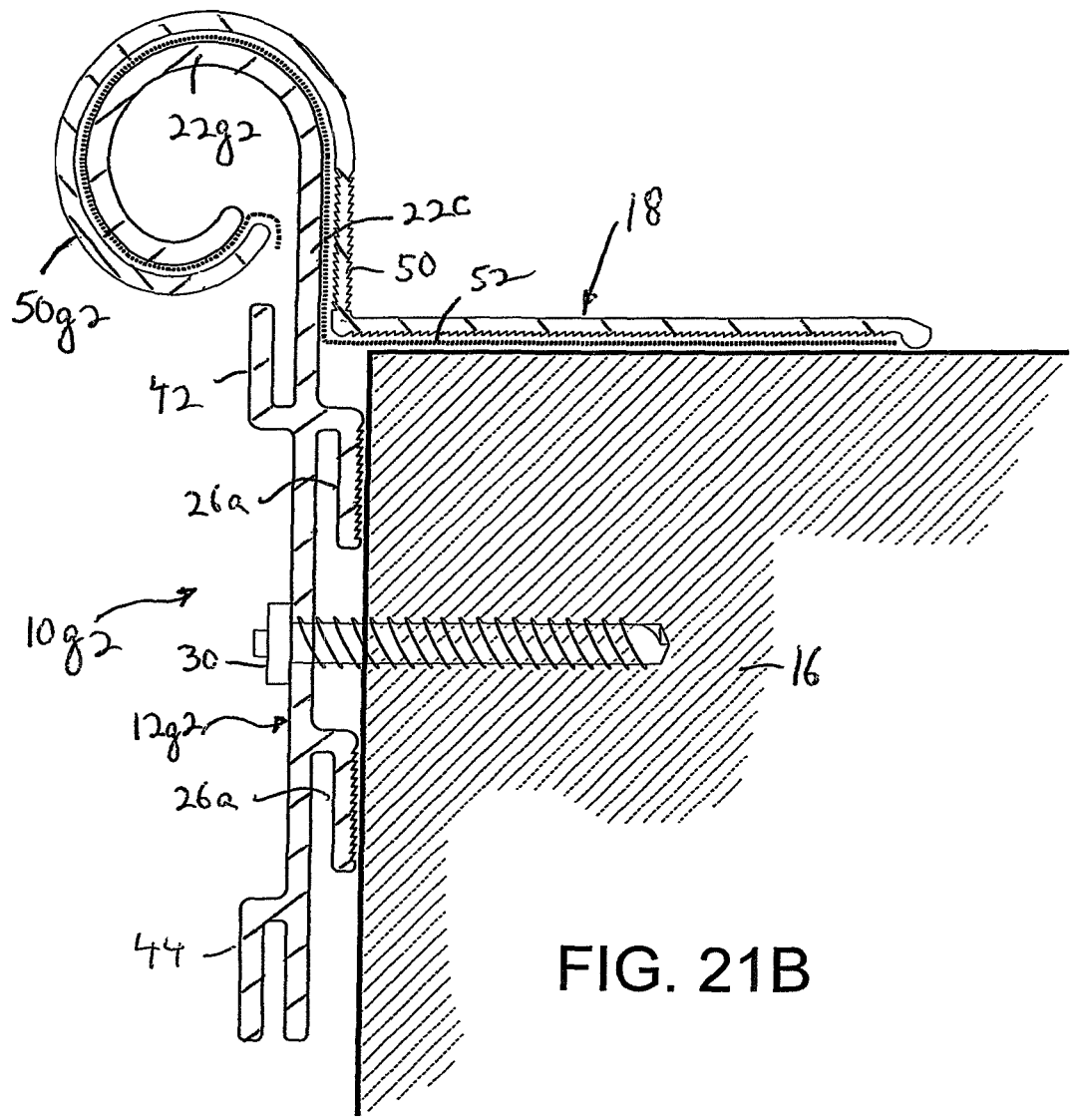
FIG. 21B is a cross-sectional view showing a building roof fascia and coping connector arrangement having a cleat which is similar to that of FIG. 21, but in which the upper end is extended vertically above the L-shape outward projection thereat and then has a substantially circular cross-sectional shaped outward bend therefrom, and the upper end of the vertical load bearing member has a substantially circular cross-sectional shaped outward bend around the substantially circular cross-sectional shaped outward bend of the cleat.

FIG. 21B shows a building roof fascia and coping connector arrangement 10g2 having a cleat 12g2 which is similar to cleat 12g of FIG. 21, but in which upward extension 22c has a substantially circular cross-sectional shaped outward bend 22g2 therefrom, and the upper end of second wall 50 of vertical load bearing member 18 has a substantially circular cross-sectional shaped outward bend 50g2 around the substantially circular cross-sectional shaped outward bend 22g2 of cleat 12g2. Roofing membrane 52 extends around substantially circular cross-sectional shaped outward bend 22g2 and within substantially circular cross-sectional shaped outward bend 50g2. Coping (not shown) extends from second outwardly extending L-shaped wall 44 up around substantially circular cross-sectional shaped outward bend 50g2 at its upper end.

Figure 21C:
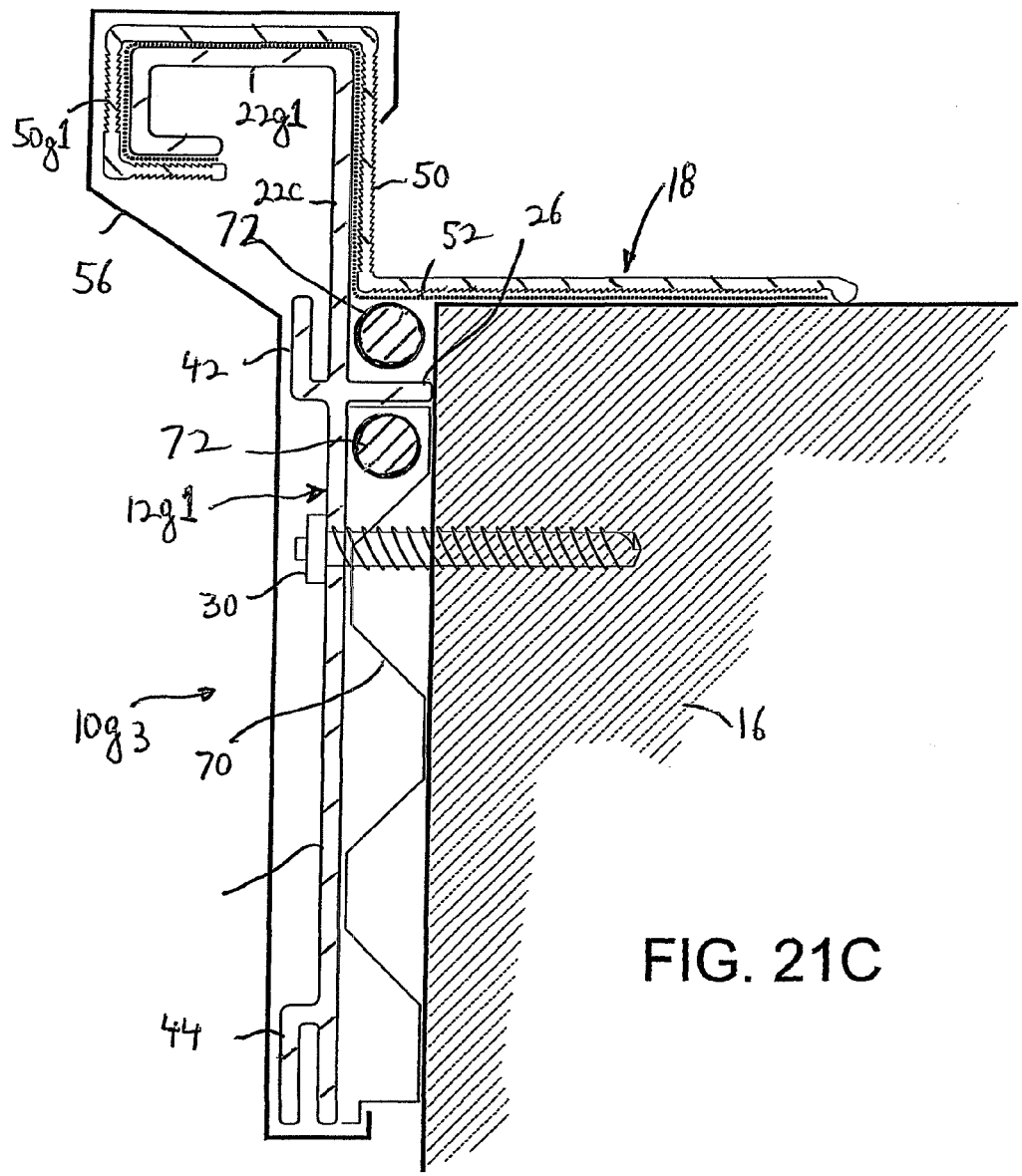
FIG. 21C is a cross-sectional view showing a building roof fascia and coping connector arrangement substantially identical to that of FIG. 21A, except that the L-shaped spacer elements are replaced by a planar spacer element and an additional spacer element, as well as heating cables being added.

FIG. 21C shows a building roof fascia and coping connector arrangement 10g3 substantially identical to that of FIG. 21A, except that L-shaped spacer elements 26a are replaced by a planar spacer element 26 and an additional spacer element 70, as well as heating cables 72 being added.

Figure 21D:
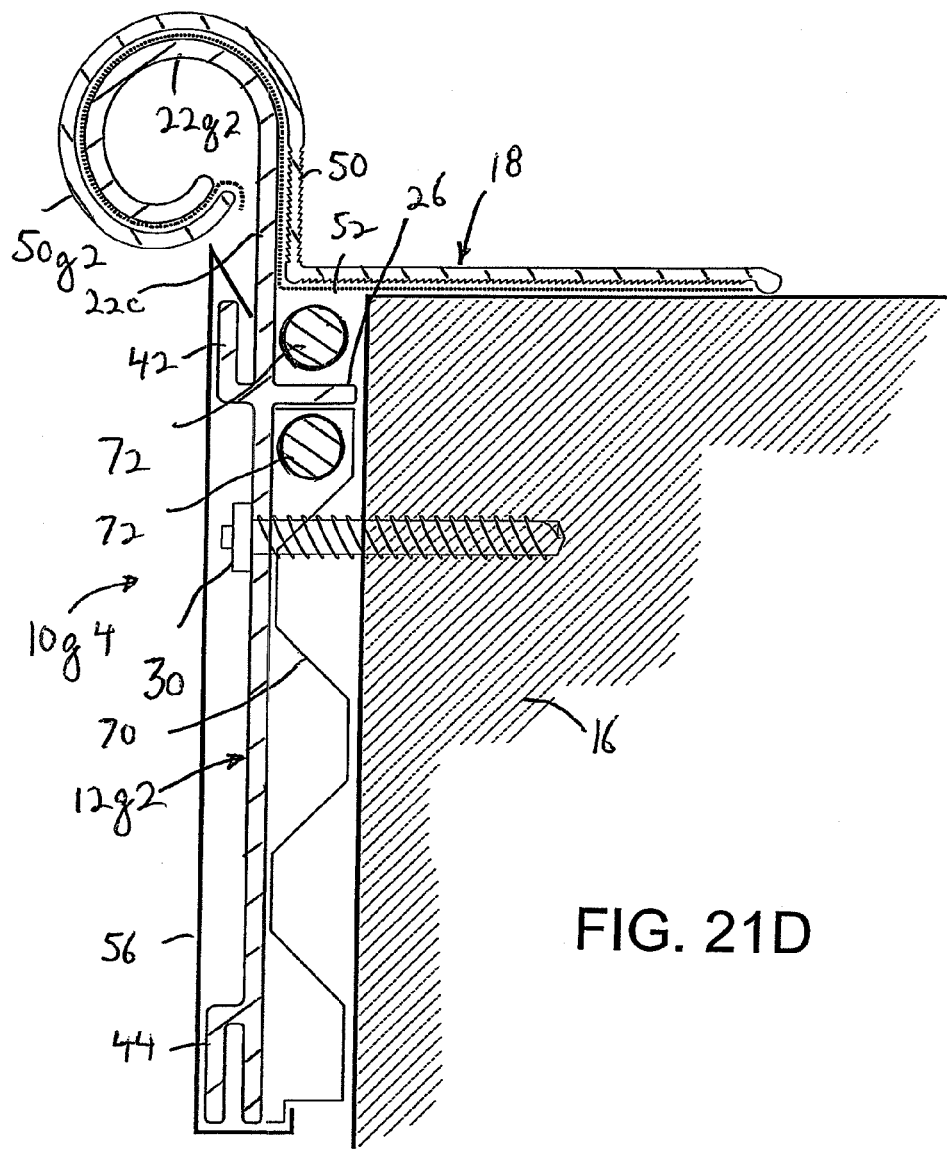
FIG. 21D is a cross-sectional view showing a building roof fascia and coping connector arrangement substantially identical to that of FIG. 21B, except that the L-shaped spacer elements are replaced by a planar spacer element and an additional spacer element, as well as heating cables being added.

FIG. 21D shows a building roof fascia and coping connector arrangement 10g4 substantially identical to that of FIG. 21B, except that L-shaped spacer elements 26a are replaced by a planar spacer element 26 and an additional spacer element 70, as well as heating cables 72 being added.

Figure 21E:
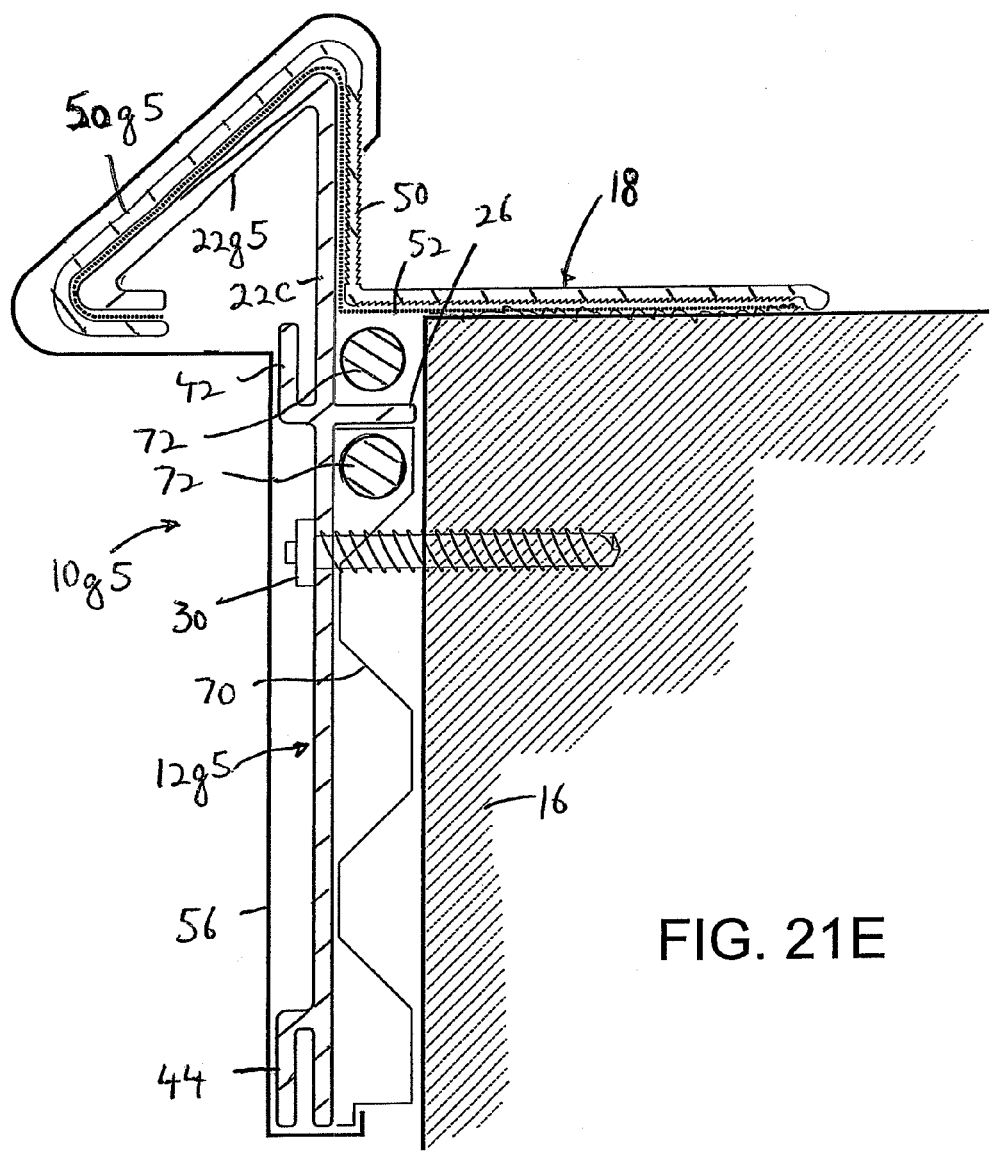
FIG. 21E is a cross-sectional view showing a building roof fascia and coping connector arrangement substantially identical to that of FIG. 21C, except that the J-shaped bends of the cleat and vertical load bearing member are replaced by triangular bends.

FIG. 21E shows a building roof fascia and coping connector arrangement 10g5 substantially identical to that of FIG. 21C, except that, with cleat 12g5 thereof, J-shaped bend 50g1 and J-shaped bend 22g1 are replaced by a triangular bend 50g5 and a triangular bend 22g5, respectively.

It will be appreciated that any other suitable shape can be used at the upper ends of upward extension 22c and second wall 50 of vertical load bearing member 18.

Figure 22:
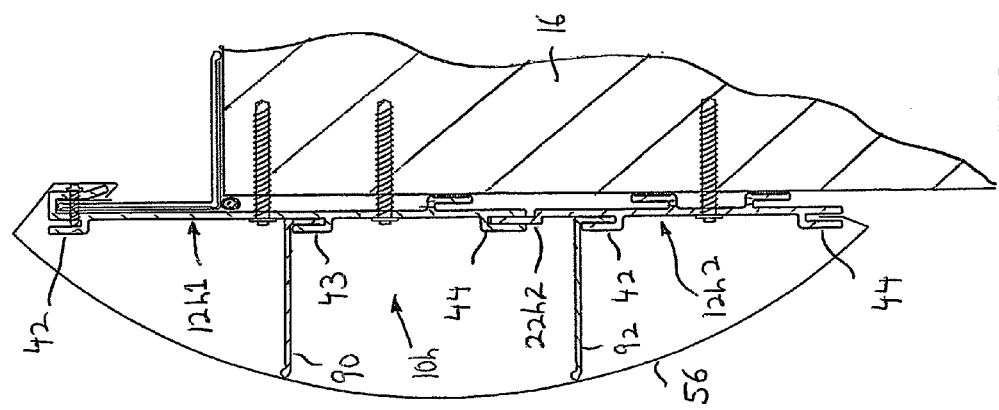
FIG. 22 is a cross-sectional view showing a building roof fascia and coping connector arrangement having two cleats directly connected together, along with coping guides to provide an arcuate shape to the coping.

Referring now to FIG. 22, there is shown a building roof fascia and coping connector arrangement 10h having two cleats 12h1 and 12h2 connected together in a vertical arrangement. The upper cleat 12h1 is substantially identical to cleat 12b of FIG. 15, while the lower cleat 12h2 is similar to cleat 12g of FIG. 21, but with the upward extension 22h2 being L-shaped so as to engage within second outwardly extending L-shaped wall 44 of upper cleat 12h1, whereby to downwardly extend the height of building roof fascia and coping connector arrangement 10h. With this arrangement, a first L-shaped coping guide 90 is connected with third outwardly extending L-shaped wall 43 of upper cleat 12h1 and extends outwardly therefrom, and second L-shaped coping guide 92 is connected with first outwardly extending L-shaped wall 42 of lower cleat 12h2 and extends outwardly therefrom. The shape of coping 56 is determined by the outward extent of the free ends of L-shaped coping guides 90 and 92. In FIG. 22, this results in coping 56 having an outwardly bowed or arcuate shape.

Figure 24:
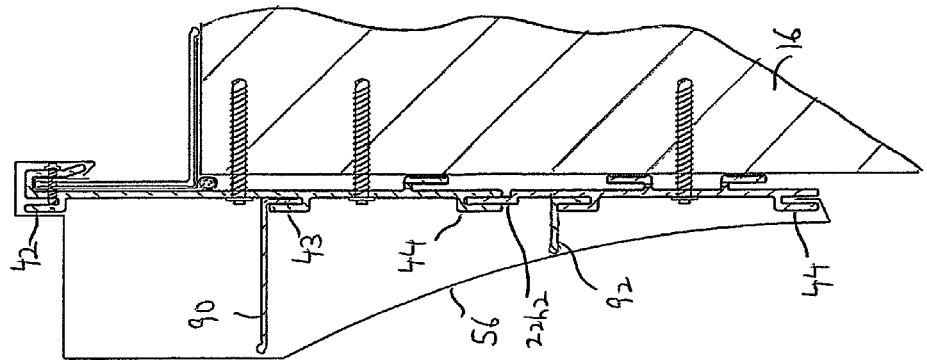
FIG. 24 is a cross-sectional view showing a building roof fascia and coping connector arrangement having two cleats directly connected together, along with coping guides to provide an arcuate slide shape to the coping.
Figure 23:
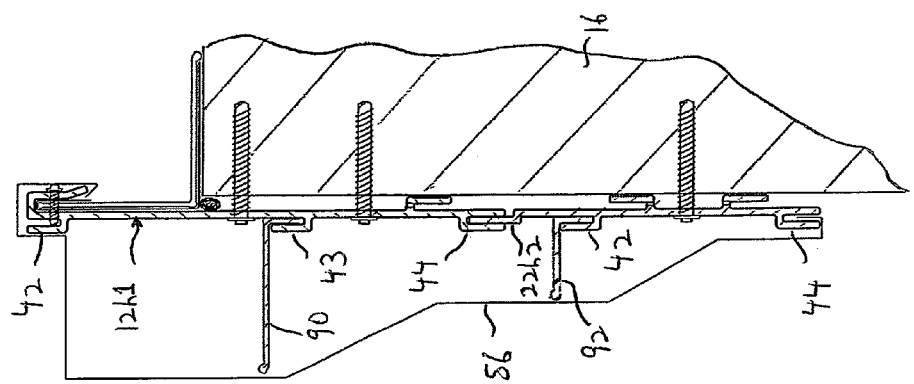
FIG. 23 is a cross-sectional view showing a building roof fascia and coping connector arrangement having two cleats directly connected together, along with coping guides to provide a stepped shape to the coping.

By changing the outward extensions of L-shaped coping guides 90 and 92, the shape of coping 56 can be changed to provide different ornamental appearances, such as the stepped shape in FIG. 23 and the arcuate slide shape in FIG. 24.

Figure 25:
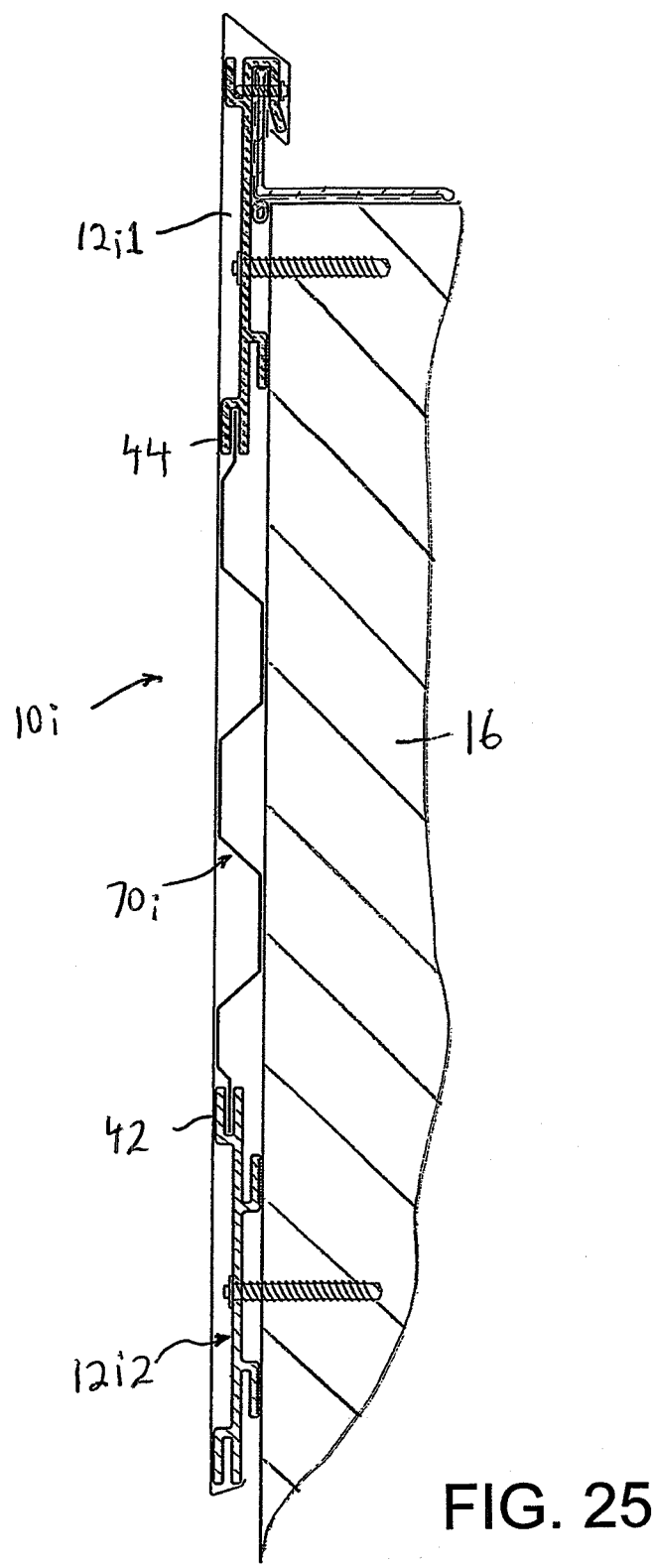
FIG. 25 is a cross-sectional view showing a building roof fascia and coping connector arrangement having two cleats connected together by an additional spacer element.

Referring now to FIG. 25, there is shown a building roof fascia and coping connector arrangement 10i having two cleats 12i1 and 12i2 connected together by an additional spacer element 70i. Specifically, cleats 12I1 and 12i2 are identical to cleats 12h1 and 12h2 in FIG. 22, with the exception that upward extension 22h2 is omitted. Additional spacer element 70i is the same as additional spacer element 70a of FIG. 3, but without outwardly extending horizontal section 82 and outwardly directed stepped section 84. The ends of additional spacer element 70i are seated in first outwardly extending L-shaped wall 42 of lower cleat 12h2 and in second outwardly extending L-shaped wall 44 of upper cleat 12h1. In this manner, the height of a building roof fascia and coping connector arrangement 10i can easily be adjusted by adjusting the height of additional spacer element 70i.

Figure 26:
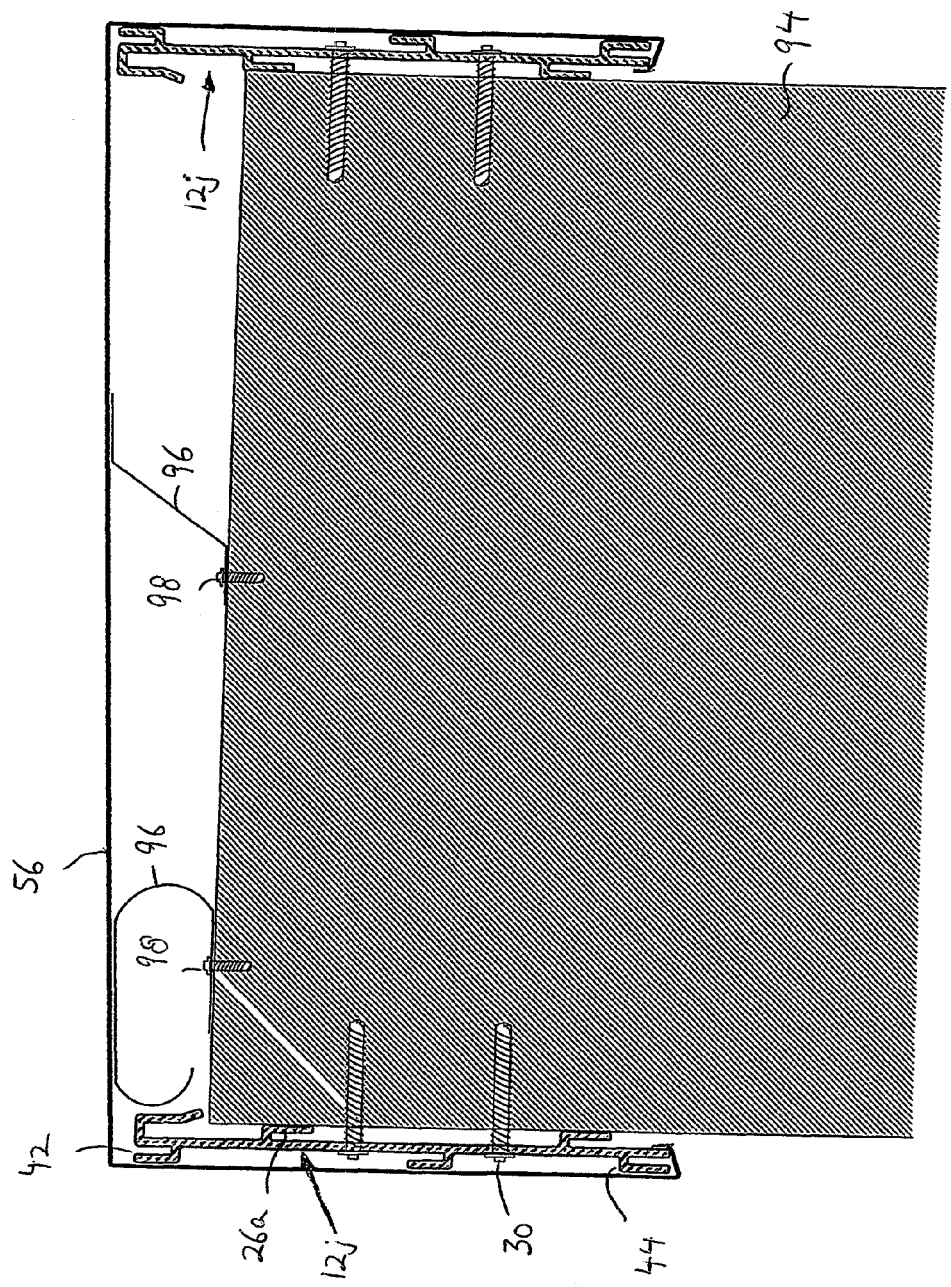
FIG. 26 is a cross-sectional view showing a building roof fascia and coping connector arrangement for use with a raised building ledge.

Referring now to FIG. 26, there is shown a building roof fascia and coping connector arrangement 10j having two cleats 12j connected to opposite sides of an upstanding building ledge 94. Each cleat 12j is the same as cleat 12h1, but with an additional L-shaped spacer element 26a. A coping 56 extends from second outwardly extending L-shaped wall 44 of one cleat 12j to a point above first outwardly extending L-shaped wall 42 of the same cleat 12j, then is bent so as to extend in spaced relation above the upper surface of roof ledge 94, is bent down around first outwardly extending L-shaped wall 42 of the opposite cleat 12j and then extends down around second outwardly extending L-shaped wall of this opposite cleat 12j. To maintain the spaced relation of coping 56 above the upper surface of ledge 94, bent aluminum spacers 96 can be secured by bolts 98 to the upper surface of ledge 94 and in contact with the underside of coping 56.

It will be appreciated that the building roof fascia and coping connector arrangements of the present invention can also be used for holding other items on buildings, such as solar panels.

Figure 27:
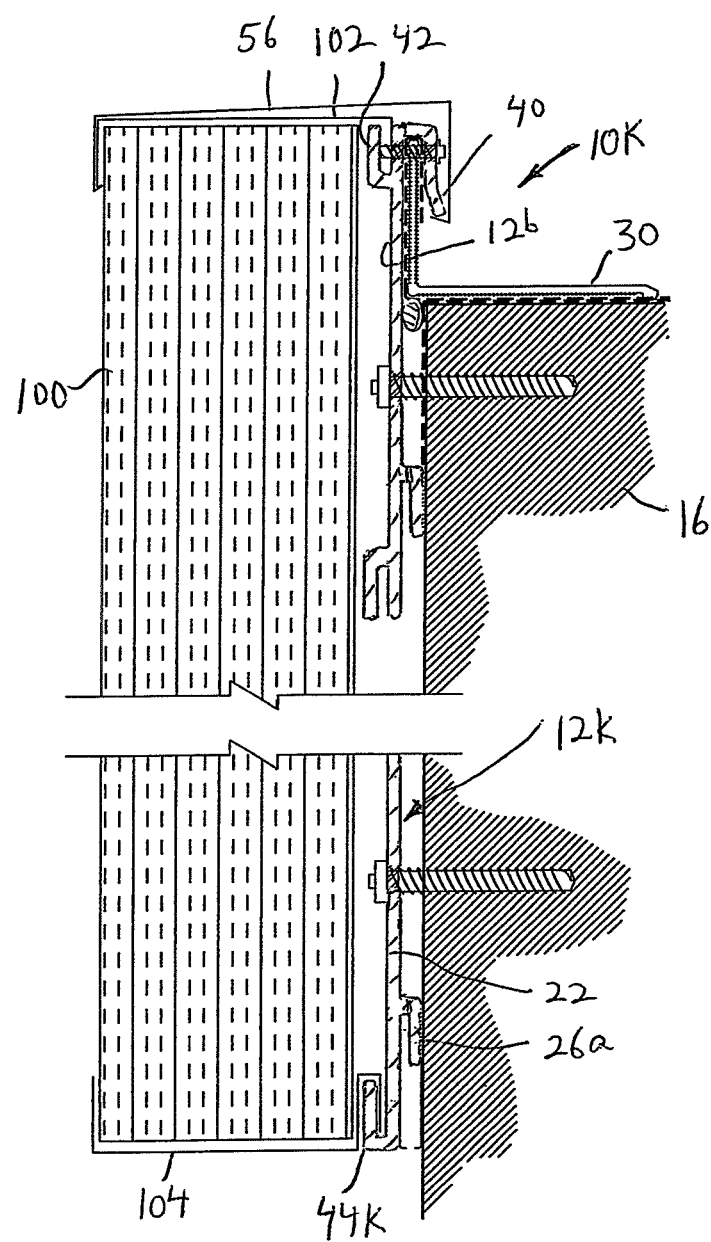
FIG. 27 is a cross-sectional view showing a building roof fascia and coping connector arrangement having two vertically spaced cleats for supporting a solar panel at a side of a building.

For example, as shown in FIG. 27, building roof fascia and coping connector arrangement 10k includes an upper cleat 12b and vertical load bearing member 30 secured to the side of a building 16 in the same manner as cleat 12b of FIG. 15. A lower cleat 12k, only a portion of which is shown, includes a planar wall 22 having a second outwardly extending L-shaped wall 44k at the lower end thereof and opening upwardly, along with an inner L-shaped spacer element 26a. A solar panel 100 is secured to cleat 12b by an extruded aluminum or other metal connector 102 that extends from an outer side at the top of solar panel 100, across the top of solar panel 100 and into first outwardly extending L-shaped wall 42 of cleat 12b, and by an extruded aluminum or other metal connector 104 that extends from an outer side at the bottom of solar panel 100, across the bottom of solar panel 100 and into second outwardly extending L-shaped wall 44k of cleat 12k. A coping 56 can be secured over the top of solar panel 100 and engaged by lower bent end 40.

Figure 27A:
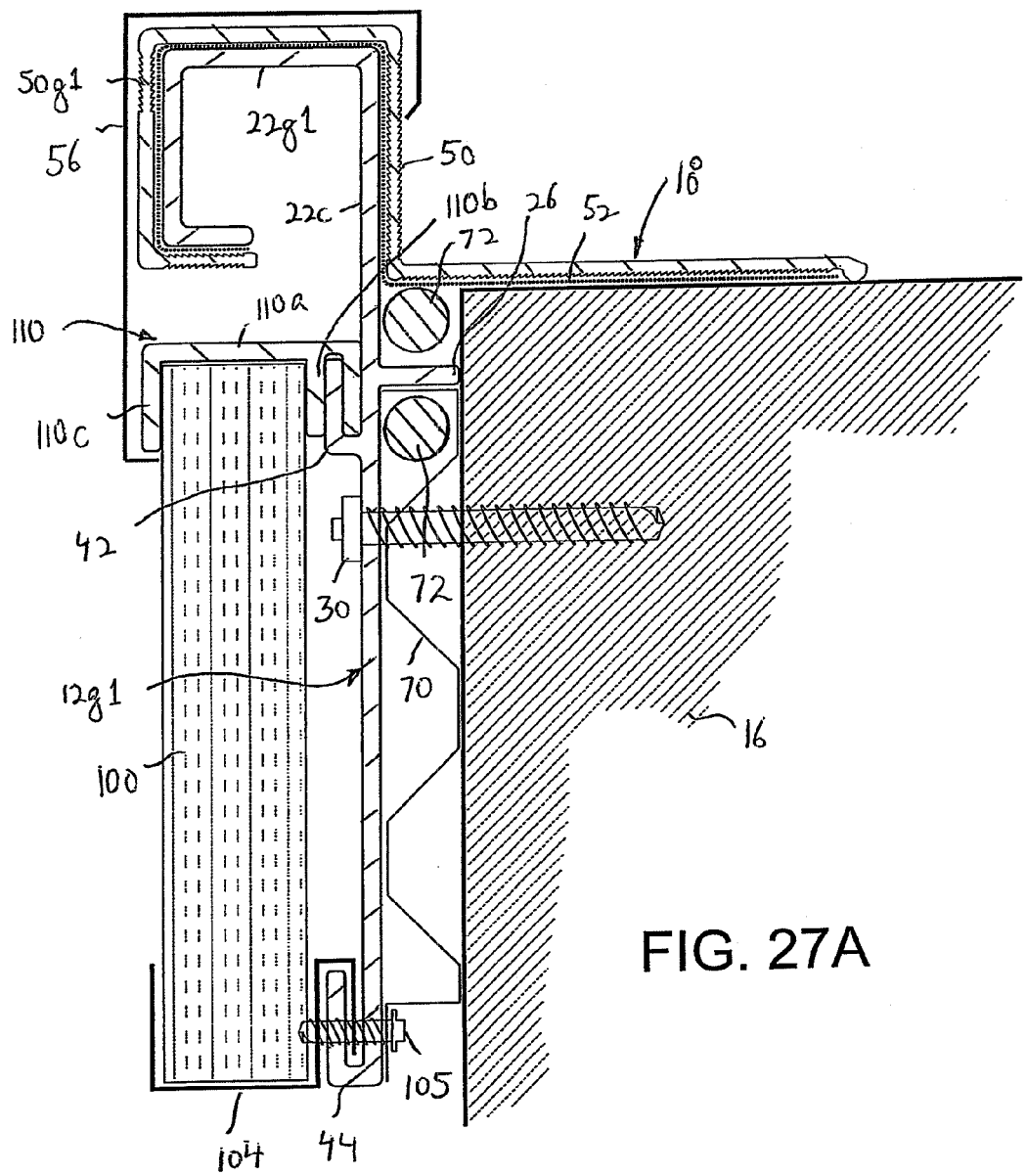
FIG. 27A is a cross-sectional view showing a building roof fascia and coping connector arrangement similar to that of FIG. 21C, but also having an arrangement for supporting a solar panel at a side of a building.

FIG. 27A shows a building roof fascia and coping connector arrangement similar to that of FIG. 21C, but also having an arrangement for supporting a solar panel 100 at a side of building 16. Specifically, a U-shaped solar panel connector 110 includes a planar wall 110a that extends along the top side of the side panel 100, a U-shaped wall 110b extending orthogonally at one end of planar wall 110a and which receives first outwardly extending L-shaped wall 42 therein and which engages the rear surface of solar panel 100, and a bent wall 110c at the opposite end of planar wall 110a that engages over an edge at the front surface of solar panel 100. An extruded aluminum or other metal connector 104 extends from an outer facing surface adjacent the bottom of solar panel 100, across the bottom of solar panel 100 and into second outwardly extending L-shaped wall 44, and is secured in second outwardly extending L-shaped wall 44 by a bolt 105. A coping 56 can be secured over the top of J-shaped bend 50g1 and extends down to the lower free end of bent wall 110c.

Figure 27B:
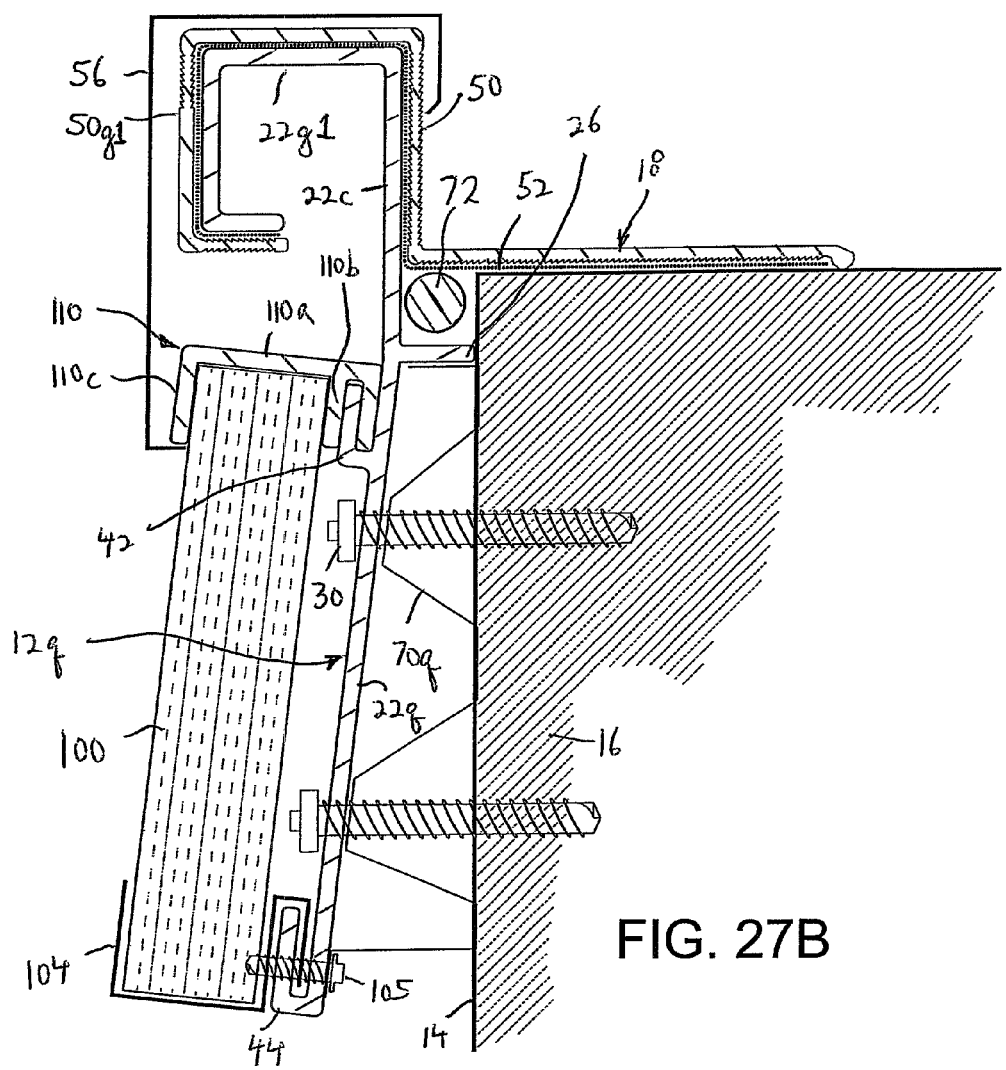
FIG. 27B is a cross-sectional view showing a building roof fascia and coping connector arrangement similar to that of FIG. 27A, in which the arrangement supports a solar panel at a side of a building at an upward angle for better exposure to the sun.

FIG. 27B shows a building roof fascia and coping connector arrangement similar to that of FIG. 27A, but in which planar wall 22q of cleat 12q below spacer wall 26 is angled away from side 14 of building 16, and additional cleat spacer element 70q increases in size in a downwardly manner in correspondence with the angle of inclination of planar wall 22q so as to support solar panel 100 at an upward angle for better exposure to the sun.

Figure 27C:
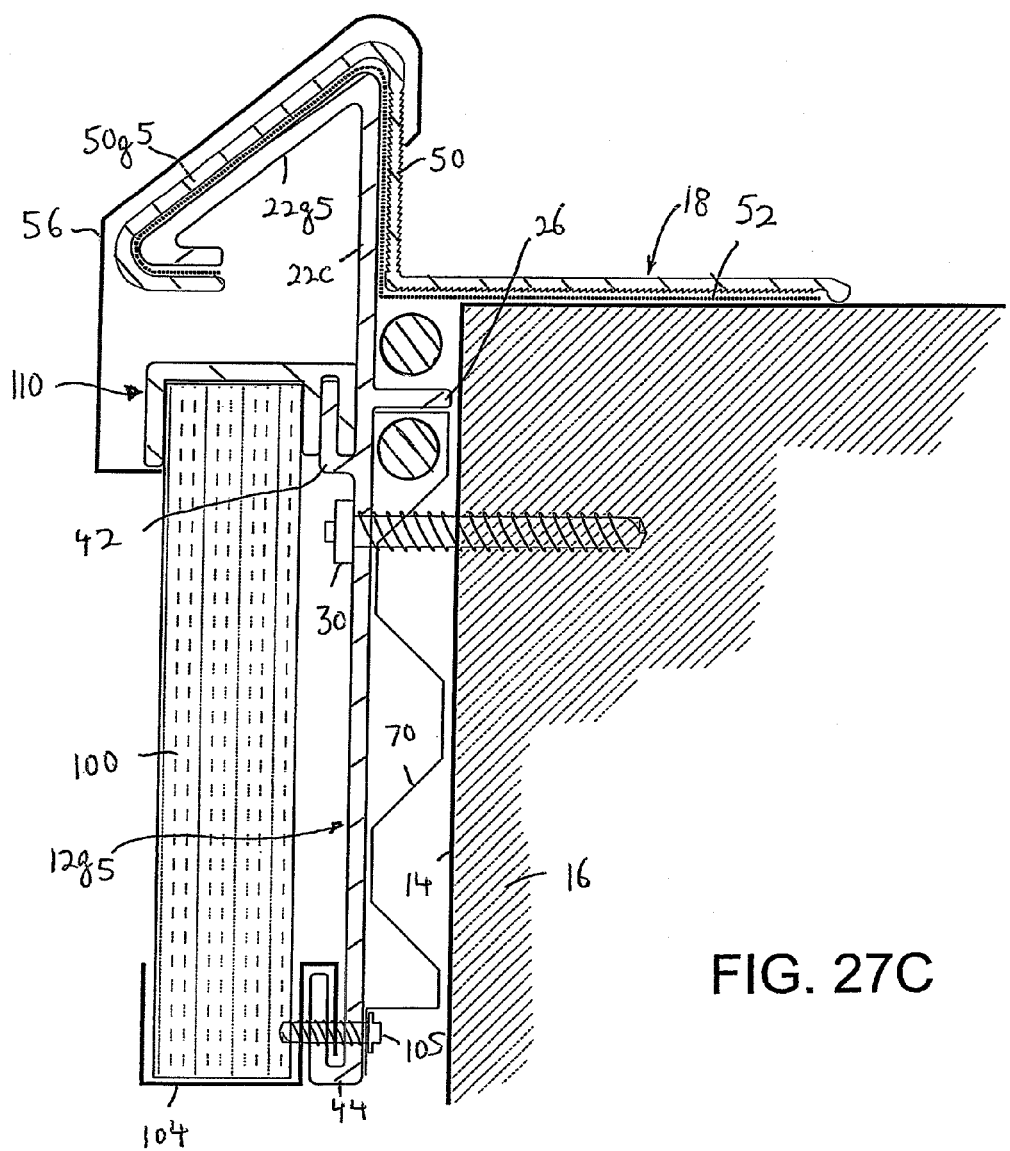
FIG. 27C is a cross-sectional view showing a building roof fascia and coping connector arrangement which is a combination of those of FIGS. 21E and 27A.
Figure 27D:
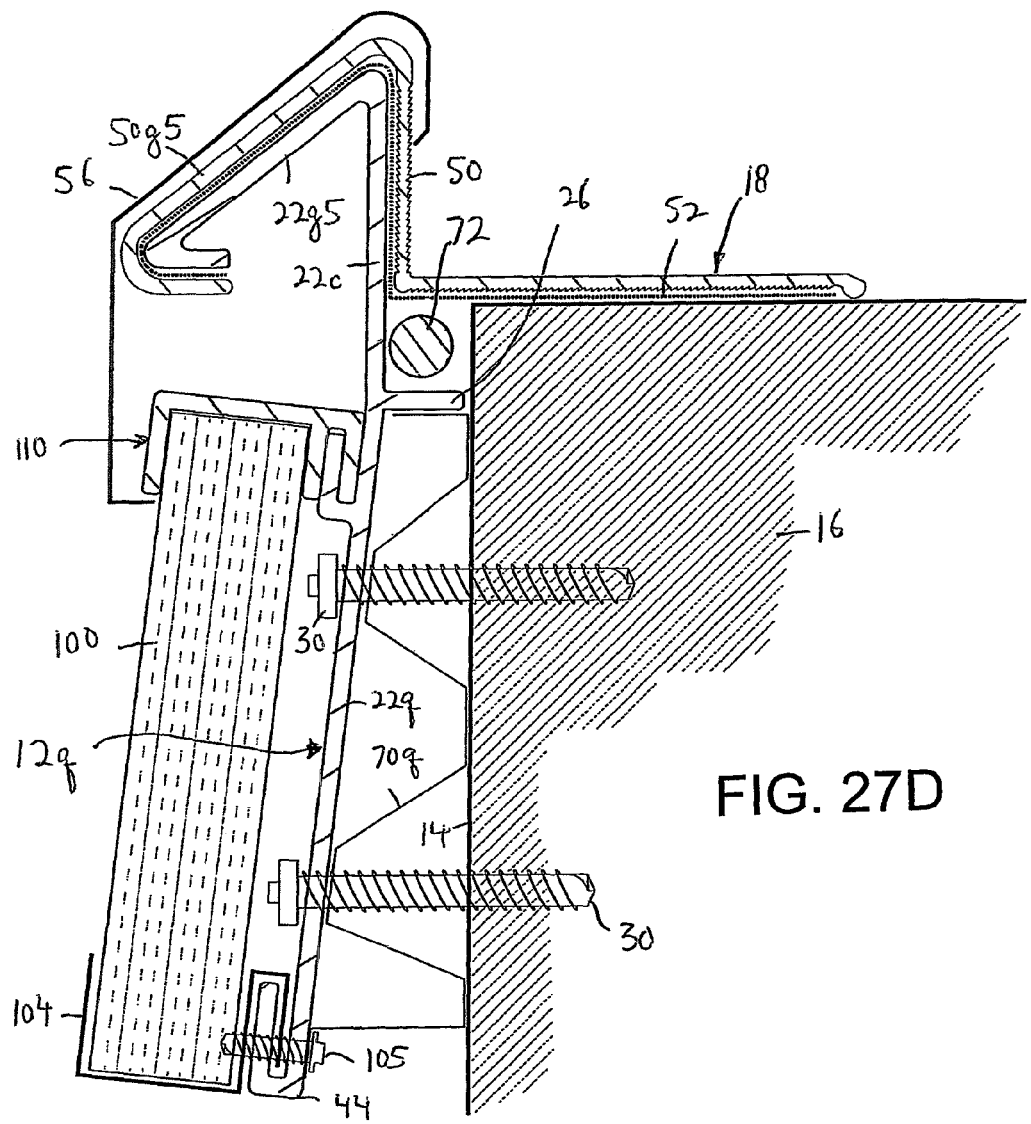
FIG. 27D is a cross-sectional view showing a building roof fascia and coping connector arrangement which is a combination of those of FIGS. 21E and 27B.

FIG. 27C shows a building roof fascia and coping connector arrangement which is a combination of those of FIGS. 21E and 27A, while FIG. 27D shows a building roof fascia and coping connector arrangement which is a combination of those of FIGS. 21E and 27B.

Figure 28:
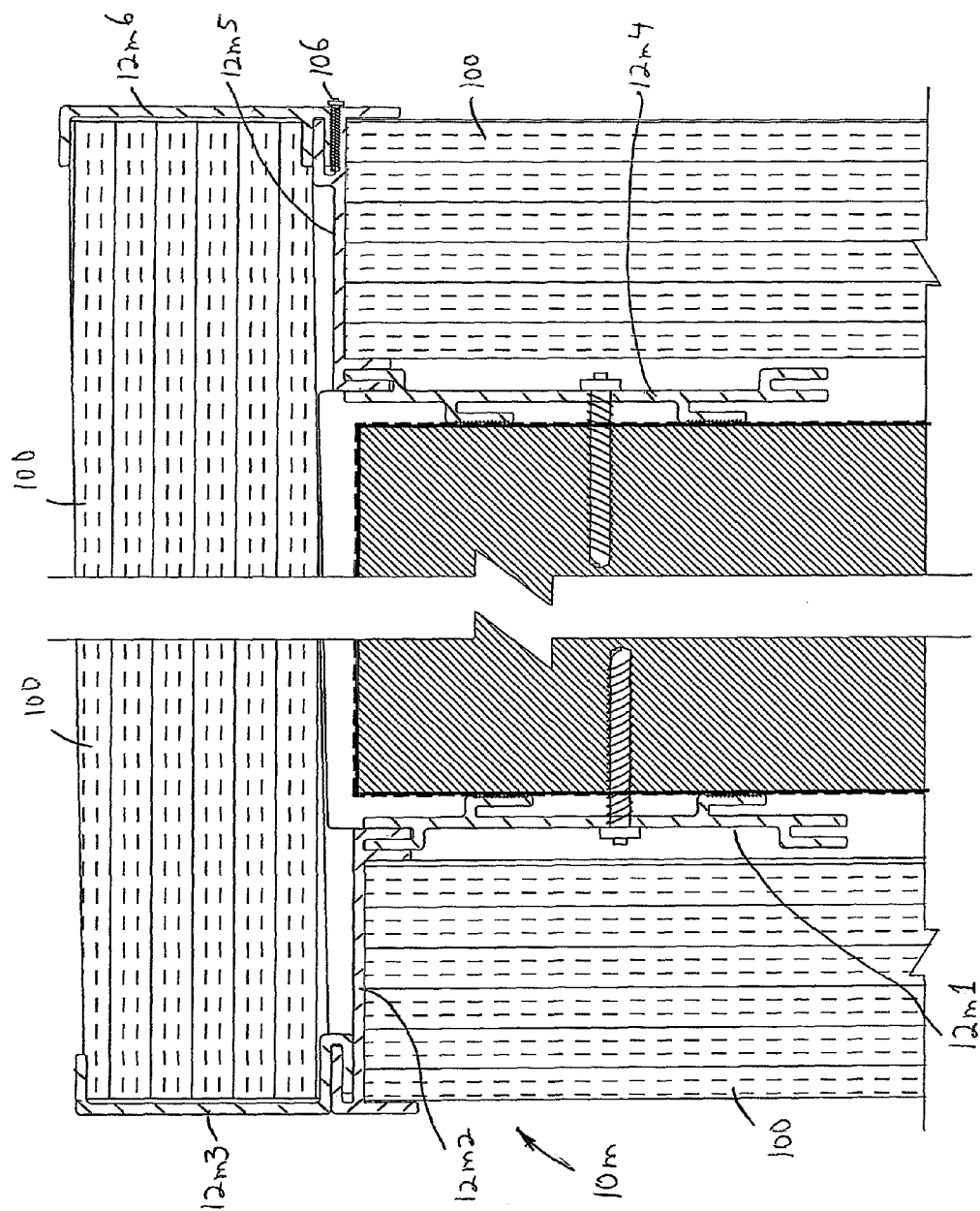
FIG. 28 is a cross-sectional view showing a building roof fascia and coping connector arrangement having a plurality of cleats for supporting a plurality of solar panels to a raised building ledge.

As another example, FIG. 28 shows a building roof fascia and coping connector arrangement 10m having a plurality of cleats 12m1-12m6 for supporting a plurality of solar panels 100 to sides and above a building ledge 94. Set screws 106 or the like can be used for securing cleats 12m1-12m6 together.

Figure 29:
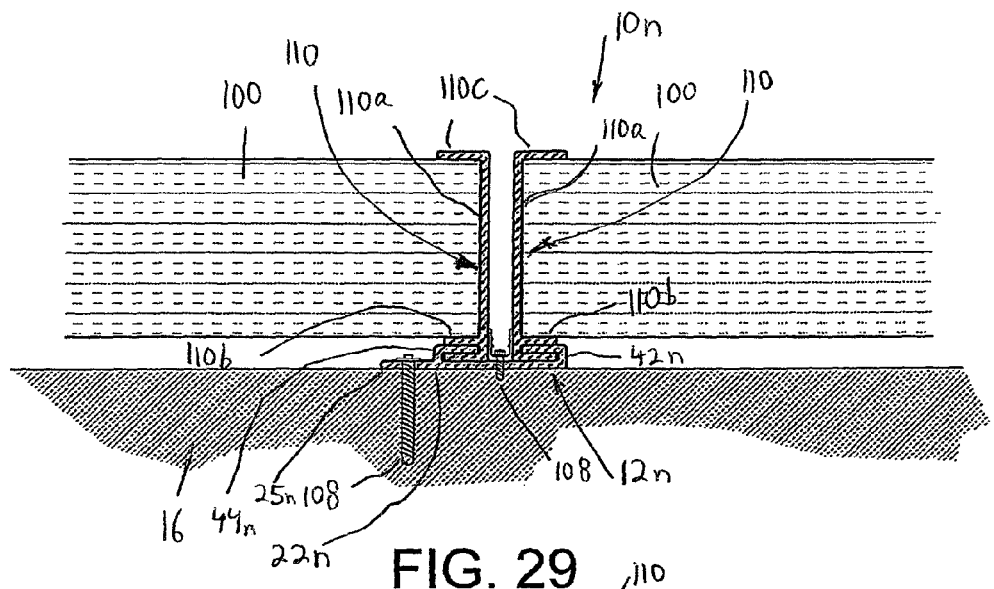
FIG. 29 is a cross-sectional view showing a building roof fascia and coping connector arrangement with different cleats for supporting two solar panels to a side wall or roof of a building.

FIG. 29 shows a building roof connector arrangement 10n with different cleats for supporting two solar panels 100 to a side wall or roof of a building. With this arrangement, a cleat 12n includes an elongated planar wall 22n having a first L-shaped wall 42n at one edge thereof, and a second L-shaped wall 44*n* which extends from the same side as planar wall 22*n* and opens in facing relation to first L-shaped wall 42*n*. Second L-shaped wall 44*n* is spaced from the opposite edge of planar wall 22*n* so that planar wall 22*n* forms a planar tail wall 25*n* to the outside of second L-shaped wall 44*n*. Screws 108 extend through planar wall 22*n* at positions between first and second L-shaped walls 42*n* and 44*n*, and at planar tail wall 25*n* to secure cleat 12*n* to the building 16.

Building roof connector arrangement 10*n* further includes U-shaped solar panel connectors 110, each of which includes a planar wall 110*a* that extends along a side of the side panel 100, a U-shaped wall 110*b* extending orthogonally at one end of planar wall 110*a* and which receives first or second L-shaped wall 42*n* or 44*n* therein and which engages the rear surface of solar panel 100, and a bent wall 110*c* at the opposite end of planar wall 110*a* that engages over an edge at the front surface of solar panel 100.

Connectors 110 can be a plurality of discrete connectors along an edge of a solar panel 100 or a continuous connector along the entire edge. Also, connectors 110 can be positioned around opposite edges of solar panel 100 or along all edges. Connectors 110 can be prefabricated with solar panel 100 so that they are assembled with solar panel 100 prior to being brought to a site for installation.

Figure 30:
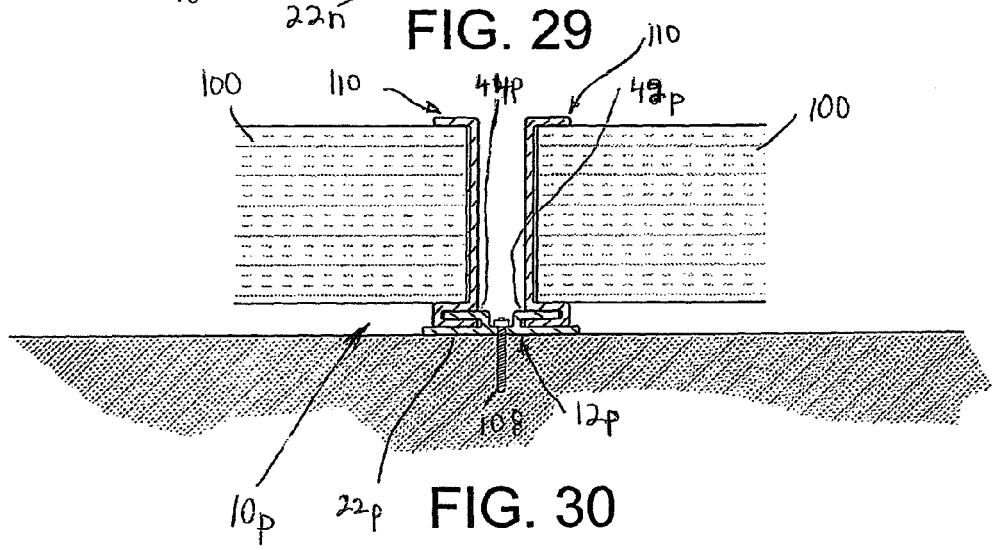
FIG. 30 is a cross-sectional view showing a different building roof fascia and coping connector arrangement with different cleats for supporting two solar panels to a side wall or roof of a building.

Referring to FIG. 30, there is shown a building roof connector arrangement 10*p* similar arrangement to building roof connector arrangement 10*n* of FIG. 29, except that cleat 12*p* has first and second L-shaped walls 42*p* and 44*p* formed with planar wall 22*p* in a manner opening in directions away from each other and with there being no planar tail wall. The construction of solar panel connectors 110 remains the same.

Figure 31:
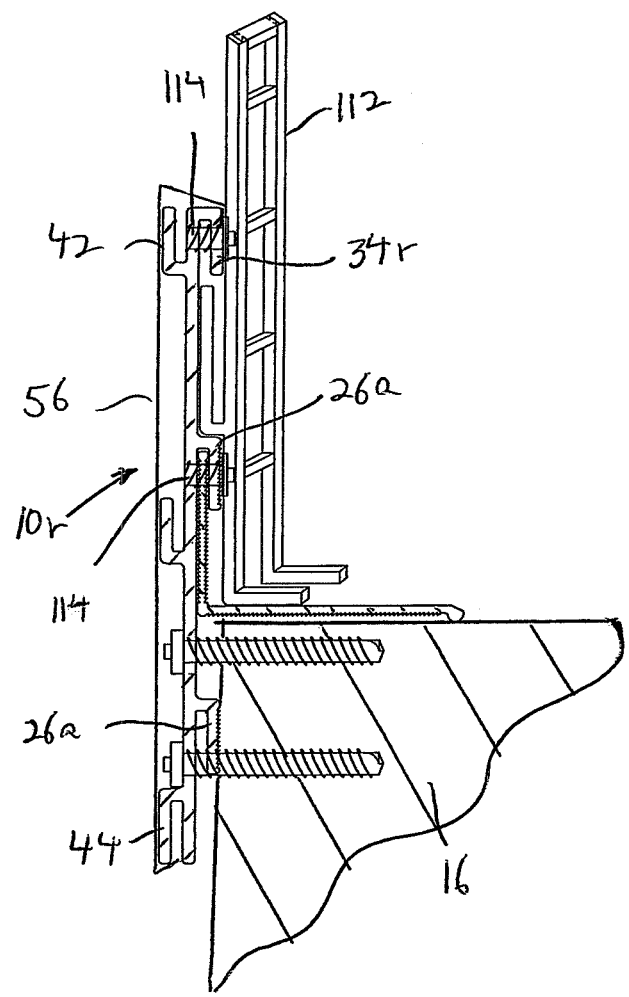
FIG. 31 is a cross-sectional view showing a building roof fascia and coping connector arrangement for also supporting a railing system to a building.

In addition to securing solar panels, the aforementioned building roof fascia and coping connector arrangements can be used to secure other elements. For example, FIG. 31 shows a building roof fascia and coping connector arrangement 10*r* which includes a cleat 12*r* substantially the same as clear 12*e* of FIG. 19 secured to the side of a building 16. In this case, however, cleat 12*r* is secured at a higher level so that both inwardly directed L-shaped wall 34*r* and the upper L-shaped spacer element 26*a* are both exposed, and a rail system or ladder 112 is secured thereto by bolts 114.

It will be appreciated that various modifications can be made to the invention within the scope of the claims. For example, although the elements have been discussed as being made of aluminum, any other suitable material such as galvanized metal, plastic, etc. can be used.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A building connector arrangement for securing at least one solar panel to a building, comprising:
   a cleat including an elongated wall adapted to be secured to the building,
   two spaced apart L-shaped walls extending outwardly from said elongated wall, said two L-shaped walls opening in opposite facing directions from each other that face each other, each of said L-shaped walls including a first leg that extends in a parallel, spaced and superposed relation from said elongated wall so as to create a space between said first leg and said elongated wall, and
   said elongated wall including a tail part that extends to one side of one of said L-shaped walls and having an opening therein for insertion of a securing element to secure the tail part to a building structure; and
   a U-shaped solar panel connector including:
   a first U-shaped gripping wall engaged with one of said L-shaped walls and with a rear surface of a respective said solar panel, said first U-shaped gripping wall including a second leg in gripping contact with the rear surface of the solar panel, a third leg positioned between said first leg and said elongated wall, and a connecting section which connects together the second and third legs,
   an opposite second gripping wall engaged with a front surface of the solar panel, and
   a connecting wall that connects together the first and second gripping walls.

* * * * *